United States Patent
Tsukamoto et al.

(10) Patent No.: US 8,683,308 B2
(45) Date of Patent: Mar. 25, 2014

(54) SEMICONDUCTOR DEVICE, INFORMATION PROCESSING APPARATUS, AND METHOD OF DETECTING ERROR

(75) Inventors: Nina Tsukamoto, Kawasaki (JP); Toshihiro Tomozaki, Kawasaki (JP); Terumasa Haneda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 202 days.

(21) Appl. No.: 13/404,669

(22) Filed: Feb. 24, 2012

(65) Prior Publication Data

US 2012/0278688 A1 Nov. 1, 2012

(30) Foreign Application Priority Data

Apr. 28, 2011 (JP) ................................. 2011-101887

(51) Int. Cl.
- *G06F 11/00* (2006.01)
- *G08C 25/00* (2006.01)
- *H03M 13/00* (2006.01)
- *H04L 1/00* (2006.01)

(52) U.S. Cl.
USPC ........... 714/799; 714/746; 714/755; 714/763; 714/782; 714/801; 714/805

(58) Field of Classification Search
USPC .......... 714/746, 755, 763, 782, 799, 801, 805
See application file for complete search history.

(56) References Cited

U.S. PATENT DOCUMENTS

| 4,852,100 | A | * | 7/1989 | Christensen et al. ......... 714/763 |
| 5,251,219 | A | * | 10/1993 | Babb ............................ 714/755 |
| 5,537,425 | A | * | 7/1996 | Tsou ............................. 714/805 |
| 2007/0266291 | A1 | * | 11/2007 | Toda et al. .................... 714/746 |
| 2009/0049366 | A1 | * | 2/2009 | Toda ............................. 714/782 |

FOREIGN PATENT DOCUMENTS

| JP | 58-105498 | 6/1983 |
| JP | 63-308800 | 12/1988 |

* cited by examiner

*Primary Examiner* — Sam Rizk
(74) *Attorney, Agent, or Firm* — Fujitsu Patent Center

(57) ABSTRACT

Each of (n−1) 2-bit checking units, where n is an integer larger than or equal to 4, receives n-bit redundant encoded data generated from 1-bit input data, and outputs 2-bit check data based on a result of comparison between bits of the encoded data, combinations of the bits differing in each comparison. An all-bit checking unit outputs all-bit check data based on exclusive ORs of all-bit of the encoded data. An error detecting unit detects errors in the encoded data on the basis of the (n−1) sets of 2-bit check data and the all-bit check data, and outputs the input data on the basis of the result of error detection.

19 Claims, 26 Drawing Sheets

FIG. 7

DECODING EXAMPLE 1 (Din=0, I[3:0]=0000, VALUE WHEN DATA ERROR OCCURS=1)

Check code definitions:
- C[0]=I[0]^I[1]
- C[1]=I[1]^I[2]
- C[2]=I[2]^I[3]
- C[3]=I[0]^I[1]^I[2]^I[3]

| | DECODER INPUT | | | | CHECK CODE | | | | | DECODER OUTPUT | | |
|---|---|---|---|---|---|---|---|---|---|---|---|---|
| | I[3] | I[2] | I[1] | I[0] | C[3] | C[2] | C[1] | C[0] | C[3:0] | Dout | ERR | UE |
| | 0 | 0 | 0 | 0 | F | F | F | F | 0 | I[0] | 0 | 0 |
| SINGLE-BIT ERROR | 0 | 0 | 0 | _1_ | T | F | F | T | 9 | I[1] | 1 | 0 |
| | 0 | 0 | _1_ | 0 | T | F | T | T | B | I[0] | 1 | 0 |
| | 0 | _1_ | 0 | 0 | T | T | T | F | E | I[0] | 1 | 0 |
| | _1_ | 0 | 0 | 0 | F | T | F | F | C | I[0] | 1 | 0 |
| DOUBLE-BIT ERROR | 0 | 0 | _1_ | _1_ | F | F | T | F | 2 | – | 1 | 1 |
| | 0 | _1_ | _1_ | 0 | F | T | T | T | 7 | – | 1 | 1 |
| | _1_ | _1_ | 0 | 0 | F | T | F | T | 5 | – | 1 | 1 |
| | _1_ | 0 | 0 | _1_ | F | T | F | T | 5 | – | 1 | 1 |
| | _1_ | 0 | _1_ | 0 | F | T | T | T | 7 | – | 1 | 1 |
| TRIPLE-BIT ERROR | 0 | _1_ | _1_ | _1_ | F | F | T | F | 2 | – | – | – |
| | _1_ | _1_ | _1_ | 0 | F | F | T | T | C | – | – | – |
| | _1_ | _1_ | 0 | _1_ | T | T | F | T | E | – | – | – |
| | _1_ | 0 | _1_ | _1_ | T | T | F | F | B | – | – | – |
| | _1_ | _1_ | _1_ | _1_ | T | F | F | T | 9 | – | – | – |

UNDERLINED PART: POSITION OF BIT ERROR

T=True(=1), F=False(=0)

–: NO GUARANTEE

FIG. 8

DECODING EXAMPLE 1 (Din=1, I[3:0]=1111, VALUE WHEN DATA ERROR OCCURS=0)

$C[0]=I[0]\wedge I[1]$
$C[1]=I[1]\wedge I[2]$
$C[2]=I[2]\wedge I[3]$
$C[3]=I[0]\wedge I[1]\wedge I[2]\wedge I[3]$

| DECODER INPUT | | | | CHECK CODE | | | | | DECODER OUTPUT | | |
|---|---|---|---|---|---|---|---|---|---|---|---|
| I[3] | I[2] | I[1] | I[0] | C[3] | C[2] | C[1] | C[0] | C[3:0] | Dout | ERR | UE |
| 1 | 1 | 1 | 1 | F | F | F | F | 0 | 1[0] | 0 | 0 |
| 1 | 1 | 1 | <u>0</u> | T | F | F | T | 9 | 1[1] | 1 | 0 |
| 1 | 1 | <u>0</u> | 1 | T | F | T | T | B | 1[0] | 1 | 0 |
| 1 | <u>0</u> | 1 | 1 | T | T | T | F | E | 1[0] | 1 | 0 |
| <u>0</u> | 1 | 1 | 1 | T | T | F | F | C | 1[0] | 1 | 0 |
| 1 | 1 | <u>0</u> | <u>0</u> | F | F | T | F | 2 | - | 1 | 1 |
| 1 | <u>0</u> | 1 | <u>0</u> | F | T | T | T | 7 | - | 1 | 1 |
| <u>0</u> | 1 | 1 | <u>0</u> | F | T | F | T | 5 | - | 1 | 1 |
| 1 | <u>0</u> | <u>0</u> | 1 | F | T | F | T | 5 | - | 1 | 1 |
| <u>0</u> | 1 | <u>0</u> | 1 | F | T | T | T | 7 | - | 1 | 1 |
| <u>0</u> | <u>0</u> | 1 | 1 | F | F | T | F | 2 | - | 1 | 1 |
| 1 | <u>0</u> | <u>0</u> | <u>0</u> | T | T | F | F | C | - | 1 | 1 |
| <u>0</u> | 1 | <u>0</u> | <u>0</u> | T | T | T | F | E | - | 1 | 1 |
| <u>0</u> | <u>0</u> | 1 | <u>0</u> | T | F | T | T | B | - | 1 | 1 |
| <u>0</u> | <u>0</u> | <u>0</u> | 1 | T | F | F | T | 9 | - | 1 | 1 |

Rows grouped as: SINGLE-BIT ERROR, DOUBLE-BIT ERROR, TRIPLE-BIT ERROR

UNDERLINED PART: POSITION OF BIT ERROR
T=True(=1), F=False(=0)
-: NO GUARANTEE

FIG. 10

EXAMPLE CALCULATION BY DECODER WHEN n = 3
(Din=0, I[2:0]=000, VALUE WHEN DATA ERROR OCCURS=1)

| DECODER INPUT | | | | CHECK CODE | | | | $C[0]=I[0]\wedge I[1]$ $C[1]=I[1]\wedge I[2]$ $C[2]=I[0]\wedge I[1]\wedge I[2]$ | |
|---|---|---|---|---|---|---|---|---|---|
| I[2] | I[1] | I[0] | | C[3] | C[2] | C[1] | C[0] | C[3:0] | |
| 0 | 0 | 0 | → | T | F | F | F | 8 | |
| 0 | 0 | <u>1</u> | → | T | F | T | F | A | |
| 0 | <u>1</u> | 0 | → | T | T | T | F | E | |
| <u>1</u> | 0 | 0 | → | T | F | T | T | B | |
| 0 | <u>1</u> | <u>1</u> | → | T | F | T | T | B | |
| <u>1</u> | 0 | <u>1</u> | → | T | T | T | F | E | |
| <u>1</u> | <u>1</u> | 0 | → | T | T | F | T | D | |

SINGLE-BIT ERROR (rows 2-4)
DOUBLE-BIT ERROR (rows 5-7)

UNDERLINED PART: POSITION OF BIT ERROR

T=True(=1), F=False(=0)

FIG. 11

EXAMPLE CALCULATION BY DECODER WHEN n = 3
(Din=1, I[2:0]=111, VALUE WHEN DATA ERROR OCCURS=0)

| DECODER INPUT | | | CHECK CODE $C[0]=I[0]\char`\^I[1]$ $C[1]=I[1]\char`\^I[2]$ $C[2]=I[0]\char`\^I[1]\char`\^I[2]$ | | | | |
|---|---|---|---|---|---|---|---|
| I[2] | I[1] | I[0] | C[3] | C[2] | C[1] | C[0] | C[3:0] |
| 1 | 1 | 1 | T | F | F | F | 8 |
| 1 | 1 | <u>0</u> | T | F | T | F | A |
| 1 | <u>0</u> | 1 | T | T | T | F | E |
| <u>0</u> | 1 | 1 | T | F | T | T | B |
| 1 | <u>0</u> | <u>0</u> | T | F | T | T | B |
| <u>0</u> | 1 | <u>0</u> | T | T | T | F | E |
| <u>0</u> | <u>0</u> | 1 | T | T | F | T | D |

Rows 2-4: SINGLE-BIT ERROR
Rows 5-7: DOUBLE-BIT ERROR

UNDERLINED PART: POSITION OF BIT ERROR

T=True(=1), F=False(=0)

FIG. 12

DECODING EXAMPLE 2 (Din=0, I[3:0]=1100, VALUE WHEN DATA ERROR OCCURS=1)

$C[0]=I[0]\wedge I[1]$
$C[1]=I[1]\wedge I[2]$
$C[2]=I[2]\wedge I[3]$
$C[3]=I[0]\wedge I[1]\wedge I[2]\wedge I[3]$

| | DECODER INPUT | | | | CHECK CODE | | | | | DECODER OUTPUT | | |
|---|---|---|---|---|---|---|---|---|---|---|---|---|
| | I[3] | I[2] | I[1] | I[0] | C[3] | C[2] | C[1] | C[0] | C[3:0] | Dout | ERR | UE |
| SINGLE-BIT ERROR | 1 | 1 | 0 | 0 | F | F | T | F | 2 | I[0] | 0 | 0 |
| | 1 | 1 | 0 | 1 | T | F | T | T | B | I[1] | 1 | 0 |
| | 1 | 1 | 1 | 0 | T | F | F | T | 9 | I[0] | 1 | 0 |
| | 1 | 0 | 0 | 0 | T | T | F | F | C | I[0] | 1 | 0 |
| | 0 | 1 | 0 | 0 | T | T | T | F | E | I[0] | 1 | 0 |
| DOUBLE-BIT ERROR | 1 | 1 | 1 | 1 | F | F | F | F | 0 | — | 1 | 1 |
| | 1 | 0 | 0 | 1 | T | T | F | T | 5 | — | 1 | 1 |
| | 1 | 0 | 1 | 0 | F | T | T | T | 7 | — | 1 | 1 |
| | 0 | 1 | 1 | 0 | F | T | T | T | 7 | — | 1 | 1 |
| TRIPLE-BIT ERROR | 1 | 0 | 1 | 1 | F | F | F | F | 0 | — | 1 | 1 |
| | 0 | 1 | 0 | 1 | T | T | F | T | E | — | 1 | 1 |
| | 0 | 0 | 1 | 1 | T | F | T | F | C | — | 1 | 1 |
| | 0 | 0 | 0 | 1 | T | F | F | T | 9 | — | 1 | 1 |
| | 0 | 0 | 1 | 0 | T | T | F | T | B | — | 1 | 1 |

UNDERLINED PART: POSITION OF BIT ERROR

T=True(=1), F=False(=0)

—: NO GUARANTEE

FIG. 13

DECODING EXAMPLE 2 (Din=1, I[3:0]=0011, VALUE WHEN DATA ERROR OCCURS=0)

| DECODER INPUT | | | | CHECK CODE | | | | | | DECODER OUTPUT | | |
|---|---|---|---|---|---|---|---|---|---|---|---|---|
| I[3] | I[2] | I[1] | I[0] | C[3] | C[2] | C[1] | C[0] | C[3:0] | | Dout | ERR | UE |
| 0 | 0 | 1 | 1 | F | F | T | F | 2 | | I[0] | 0 | 0 |
| 0 | 0 | 1 | <u>0</u> | T | F | T | T | B | | I[1] | 1 | 0 |
| 0 | 0 | <u>0</u> | 1 | T | F | F | T | 9 | | I[0] | 1 | 0 |
| 0 | <u>1</u> | 1 | 1 | T | T | F | F | C | | I[0] | 1 | 0 |
| <u>1</u> | 0 | 1 | 1 | T | T | T | F | E | | I[0] | 1 | 0 |
| 0 | 0 | <u>0</u> | <u>0</u> | F | F | F | F | 0 | | - | - | 1 |
| 0 | <u>1</u> | 0 | <u>0</u> | F | T | F | T | 5 | | - | 1 | 1 |
| <u>1</u> | 0 | 0 | <u>0</u> | F | T | T | T | 7 | | - | 1 | 1 |
| 0 | <u>1</u> | <u>0</u> | 1 | F | T | T | T | 7 | | - | 1 | 1 |
| <u>1</u> | 0 | <u>0</u> | 1 | F | F | F | F | 0 | | - | 1 | 1 |
| <u>1</u> | <u>1</u> | 1 | 1 | T | T | T | F | E | | - | 1 | 1 |
| 0 | <u>1</u> | <u>0</u> | <u>0</u> | T | F | F | F | C | | - | - | 1 |
| <u>1</u> | 0 | <u>0</u> | <u>0</u> | T | F | F | T | 9 | | - | - | 1 |
| <u>1</u> | <u>1</u> | 1 | <u>0</u> | T | F | T | T | B | | - | - | 1 |

SINGLE-BIT ERROR
DOUBLE-BIT ERROR
TRIPLE-BIT ERROR

UNDERLINED PART: POSITION OF BIT ERROR

C[0]=I[0]^I[1]
C[1]=I[1]^I[2]
C[2]=I[2]^I[3]
C[3]=I[0]^I[1]^I[2]^I[3]

T=True(=1), F=False(=0)

-: NO GUARANTEE

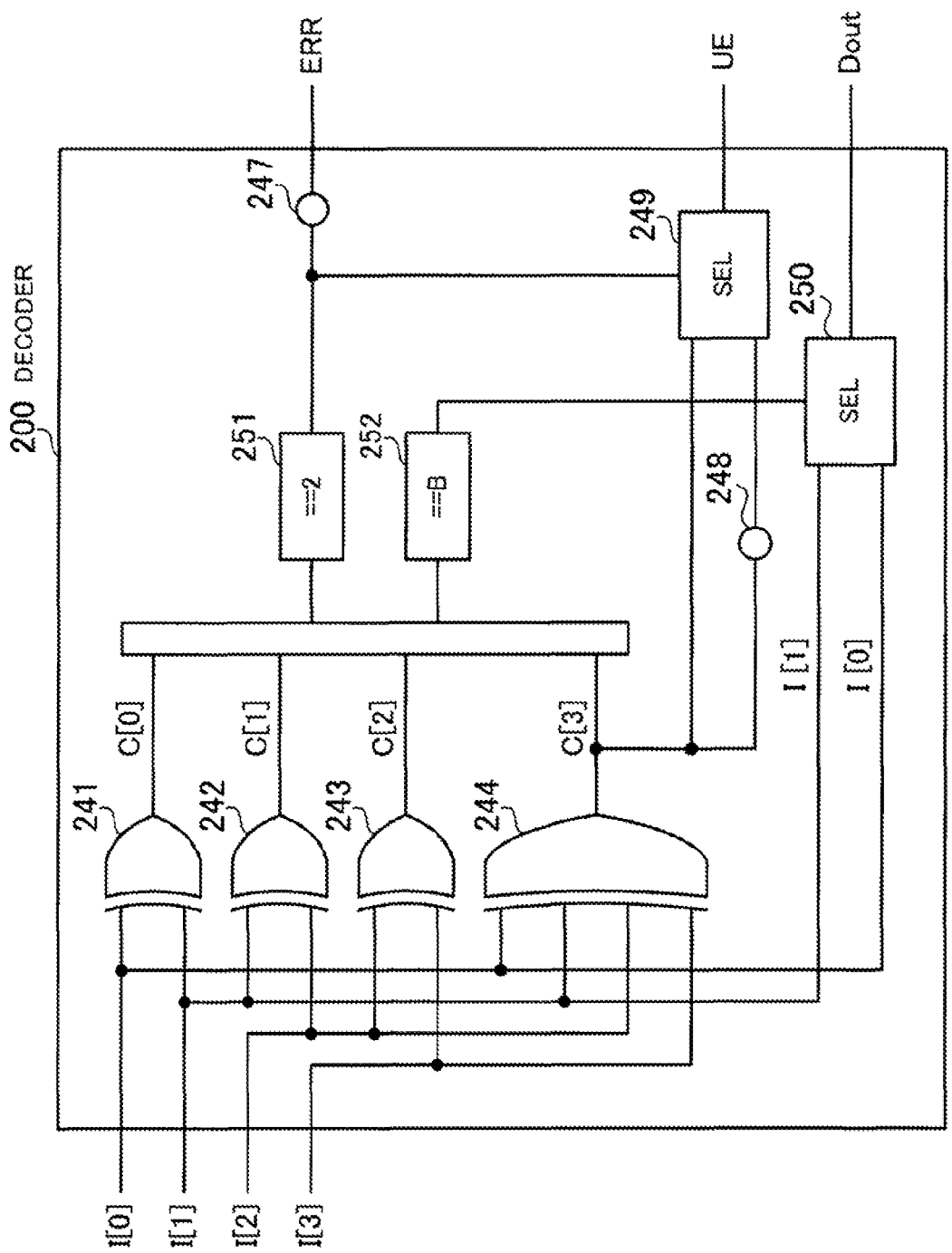

FIG. 15

DECODING EXAMPLE 3 (Din=0, I[3:0]=0000, VALUE WHEN DATA ERROR OCCURS=1)

C[0]=~(I[0]^I[1])
C[1]=~(I[0]^I[2])
C[2]=~(I[1]^I[2])
C[3]=~(I[0]^I[1]^I[2]^I[3])

T=True(=1), F=False(=0)

| DECODER INPUT | | | | CHECK CODE | | | | | DECODER OUTPUT | | |
|---|---|---|---|---|---|---|---|---|---|---|---|
| I[3] | I[2] | I[1] | I[0] | C[3] | C[2] | C[1] | C[0] | C[3:0] | Dout | ERR | UE |
| 0 | 0 | 0 | 0 | T | T | T | T | F | I[1] | 0 | 1 |
| 0 | 0 | 0 | <u>1</u> | F | T | T | F | 4 | I[1] | 1 | 0 |
| 0 | 0 | <u>1</u> | 0 | F | F | F | T | 2 | I[0] | 1 | 0 |
| 0 | <u>1</u> | 0 | 0 | F | F | T | F | 1 | I[0] | 1 | 0 |
| <u>1</u> | 0 | 0 | 0 | F | T | T | T | 7 | I[1] | 1 | 0 |
| 0 | 0 | <u>1</u> | <u>1</u> | T | F | F | T | 9 | – | – | – |
| 0 | <u>1</u> | 0 | <u>1</u> | T | F | T | F | A | – | – | – |
| <u>1</u> | 0 | 0 | <u>1</u> | T | T | T | F | C | – | – | – |
| 0 | <u>1</u> | <u>1</u> | 0 | T | T | F | F | C | – | – | – |
| <u>1</u> | 0 | <u>1</u> | 0 | T | F | F | T | A | – | – | – |
| <u>1</u> | <u>1</u> | 0 | 0 | F | F | F | T | 9 | – | – | – |
| 0 | <u>1</u> | <u>1</u> | <u>1</u> | F | T | F | T | 7 | – | – | – |
| <u>1</u> | 0 | <u>1</u> | <u>1</u> | F | F | T | F | 1 | – | – | – |
| <u>1</u> | <u>1</u> | 0 | <u>1</u> | F | F | T | F | 2 | – | – | – |
| <u>1</u> | <u>1</u> | <u>1</u> | 0 | F | T | F | F | 4 | – | – | – |

SINGLE-BIT ERROR / DOUBLE-BIT ERROR / TRIPLE-BIT ERROR

UNDERLINED PART: POSITION OF BIT ERROR

–: NO GUARANTEE

FIG. 16

DECODING EXAMPLE 3 (Din=1, I[3:0]=1111, VALUE WHEN DATA ERROR OCCURS=0)

C[0]=~(I[0]^I[1])
C[1]=~(I[0]^I[2])
C[2]=~(I[1]^I[2])
C[3]=~(I[0]^I[1]^I[2]^I[3])

| DECODER INPUT (OCCURRENCE OF BIT ERROR) | | | | CHECK CODE | | | | | DECODER OUTPUT | | |
|---|---|---|---|---|---|---|---|---|---|---|---|
| I[3] | I[2] | I[1] | I[0] | C[3] | C[2] | C[1] | C[0] | C[3:0] | Dout | ERR | UE |
| 1 | 1 | 1 | 1 | T | T | T | T | F | I[1] | 0 | 1 |
| 1 | 1 | 1 | <u>0</u> | F | T | F | F | 4 | I[1] | 1 | 0 |
| 1 | 1 | <u>0</u> | 1 | F | F | T | F | 2 | I[0] | 1 | 0 |
| 1 | <u>0</u> | 1 | 1 | F | F | F | T | 1 | I[0] | 1 | 0 |
| <u>0</u> | 1 | 1 | 1 | F | T | T | T | 7 | I[1] | 1 | 0 |
| 1 | 1 | <u>0</u> | <u>0</u> | T | F | F | T | 9 | - | 1 | 1 |
| 1 | <u>0</u> | 1 | <u>0</u> | T | F | T | F | A | - | 1 | 1 |
| <u>0</u> | 1 | 1 | <u>0</u> | T | T | F | F | C | - | 1 | 1 |
| 1 | <u>0</u> | <u>0</u> | 1 | T | T | F | F | C | - | 1 | 1 |
| <u>0</u> | 1 | <u>0</u> | 1 | T | F | T | F | A | - | 1 | 1 |
| <u>0</u> | <u>0</u> | 1 | 1 | T | F | F | T | 9 | - | 1 | 1 |
| 1 | <u>0</u> | <u>0</u> | <u>0</u> | F | T | T | T | 7 | - | - | - |
| <u>0</u> | 1 | <u>0</u> | <u>0</u> | F | F | F | T | 1 | - | - | - |
| <u>0</u> | <u>0</u> | 1 | <u>0</u> | F | F | T | F | 2 | - | - | - |
| <u>0</u> | <u>0</u> | <u>0</u> | 1 | F | T | F | F | 4 | - | - | - |

SINGLE-BIT ERROR (rows 2-5)
DOUBLE-BIT ERROR (rows 6-11)
TRIPLE-BIT ERROR (rows 12-15)

UNDERLINED PART: POSITION OF BIT ERROR

T=True(=1), F=False(=0)

-: NO GUARANTEE

EXAMPLE OF SYMBOL-BY-SYMBOL ENCODING

FIG. 19

| | I3 | I2 | I1 | I0 | |
|---|---|---|---|---|---|
| BIT ERROR PATTERN 1 | 00000000 | 11111111 | 00000000 | 00000000 | ⇒ CORRECTABLE |
| BIT ERROR PATTERN 2 | 11101110 | 11011101 | 01000100 | 10001000 | ⇒ CORRECTABLE |
| BIT ERROR PATTERN 3 | 00000000 | 00000000 | 00000000 | 00000000 | ⇒ DETECTABLE |
| BIT ERROR PATTERN 4 | 11101110 | 11101110 | 10001000 | 10001000 | ⇒ DETECTABLE |

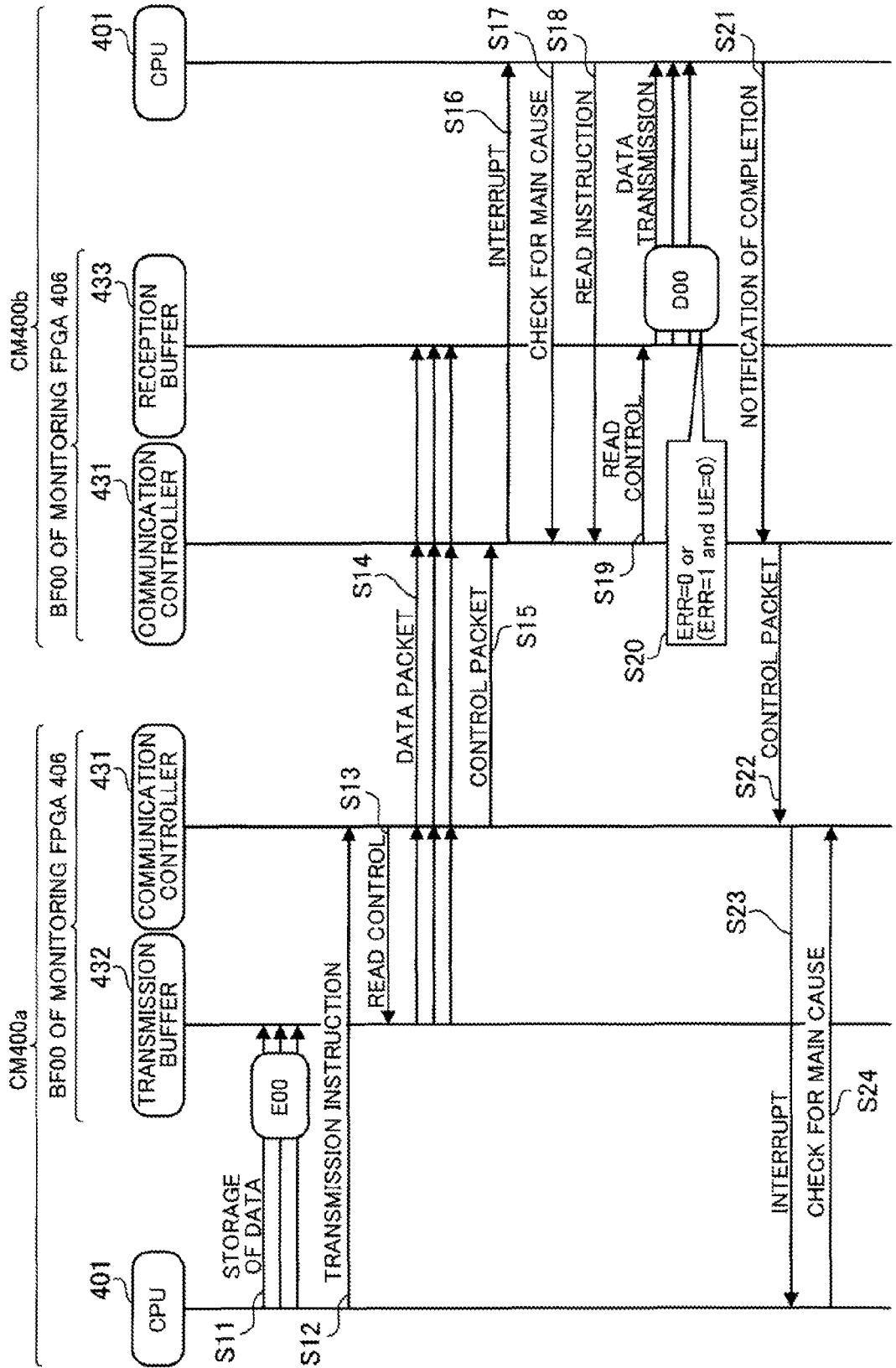

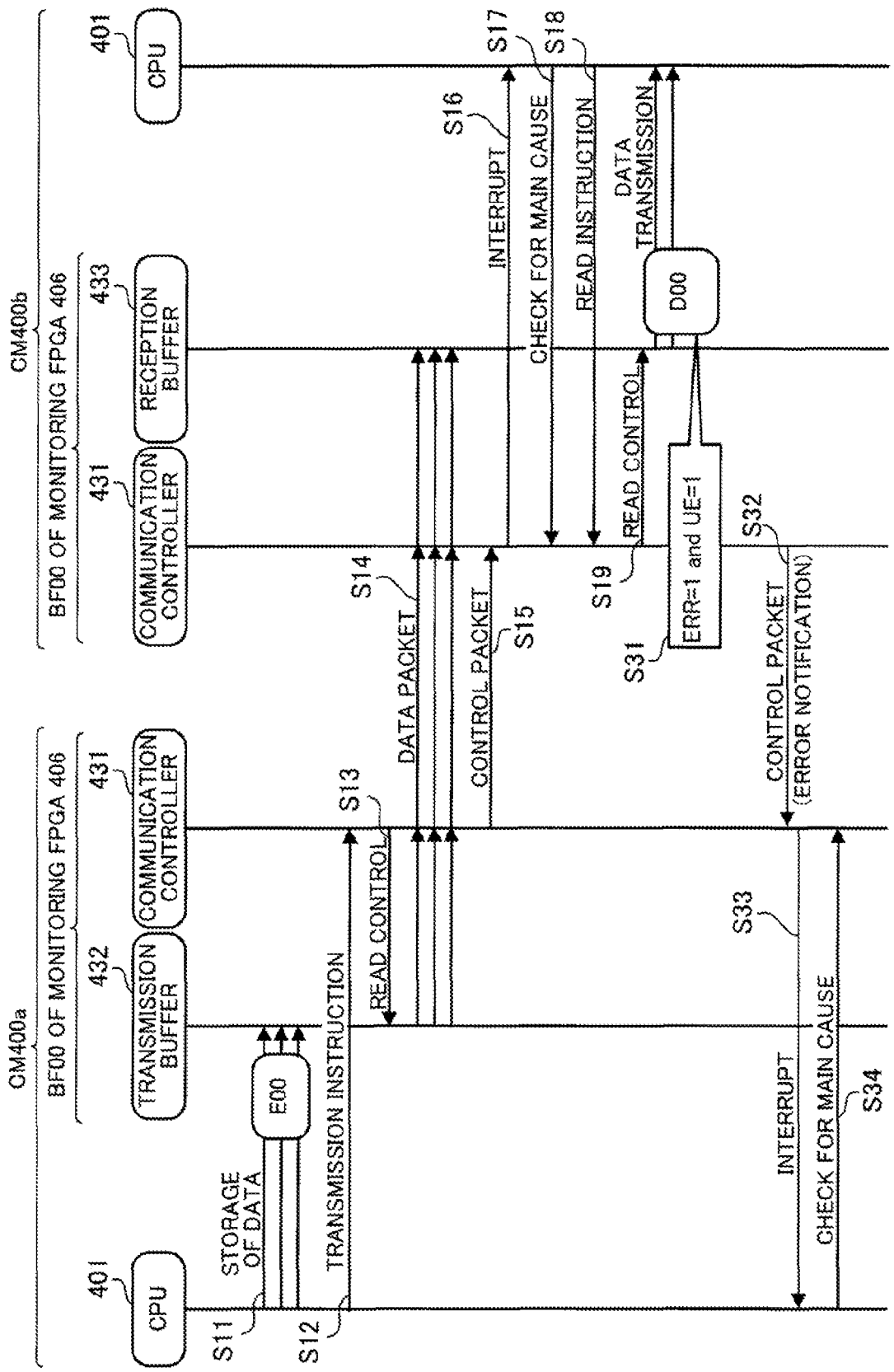

SEMICONDUCTOR DEVICE, INFORMATION PROCESSING APPARATUS, AND METHOD OF DETECTING ERROR

CROSS-REFERENCE TO RELATED APPLICATION

This application is based upon and claims the benefit of priority of the prior Japanese Patent Application No. 2011-101887, filed on Apr. 28, 2011, the entire contents of which are incorporated herein by reference.

FIELD

The embodiments discussed herein are related to semiconductor devices, information processing apparatuses, methods of detecting errors.

BACKGROUND

A method of detecting and correcting errors using error-correcting code (ECC) may be used to protect data stored in memories. Memories having a function of error detection and correction using ECC detect and correct single-bit errors and detect double-bit errors while data is being read. The function of error detection and correction using ECC is used in, for example, random-access memories (RAMs) according to Dual In-line Memory Module (DIMM) Standard. The function of error detection and correction is also used to protect data to be transferred to buses.

As another example method of detecting and correcting errors in memories, 4-bit data including 2-bit data and additional redundant 2-bit data may be recorded in memory cells, and read data may be converted such that correct data is read out with a high possibility even if one or two bits of the 4-bit data are inverted from "0" to "1". Furthermore, 1-bit information may be recorded in three or more memory cells, and outputs from the memory cells may be subjected to majority decision (see, for example, Japanese Laid-open Patent Publication Nos. 63-308800 and 58-105498).

Reliability of data transmission may be improved by error detection and correction using ECC compared with, for example, methods of detecting errors using parity bits. Meanwhile, error detection and correction using ECC is complicated due to data convolution operations included in the process, resulting in an increase in the scale of circuits that implement the process.

SUMMARY

According to one aspect of the invention, a semiconductor device includes a decoding circuit provided with (n−1) 2-bit checking units, where n is an integer larger than or equal to 4, each receiving n-bit redundant encoded data generated from 1-bit input data and outputting (n−1) sets of 2-bit check data based on results of comparisons between bits of the encoded data, combinations of the bits differing in each comparison; an all-bit checking unit that outputs all-bit check data based on exclusive ORs of all bits of the encoded data; and an error detecting unit that detects errors in the encoded data on the basis of the (n−1) sets of the 2-bit check data and the all-bit check data and that outputs the input data on the basis of a result of error detection.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a first graph illustrating the relationship among input data, check codes, and decoder outputs in Decoding Example 1;

FIG. 8 is a second graph illustrating the relationship among the input data, the check codes, and the decoder outputs in Decoding Example 1;

FIG. 10 illustrates a first example calculation by the decoder when n=3;

FIG. 11 illustrates a second example calculation by the decoder when n=3;

FIG. 12 is a first graph illustrating the relationship among input data, check codes, and decoder outputs in Decoding Example 2;

FIG. 13 is a second graph illustrating the relationship among the input data, the check codes, and the decoder outputs in Decoding Example 2;

FIG. 14 illustrates an example circuit configuration of a decoder that implements Decoding Example 2;

FIG. 15 is a first graph illustrating the relationship among input data, check codes, and decoder outputs in Decoding Example 3.

FIG. 16 is a second graph illustrating the relationship among the input data, the check codes, and the decoder outputs in Decoding Example 3;

FIG. 19 illustrates examples of bit error patterns of encoded data encoded a symbol at a time;

FIG. 25 is a sequence diagram illustrating an example process sequence when data is normally transferred between the CPUs of the two CMs; and FIG. 26 is a sequence diagram illustrating an example process sequence when data is not normally transferred between the CPUs of the two CMs.

DESCRIPTION OF EMBODIMENTS

Figure 1:
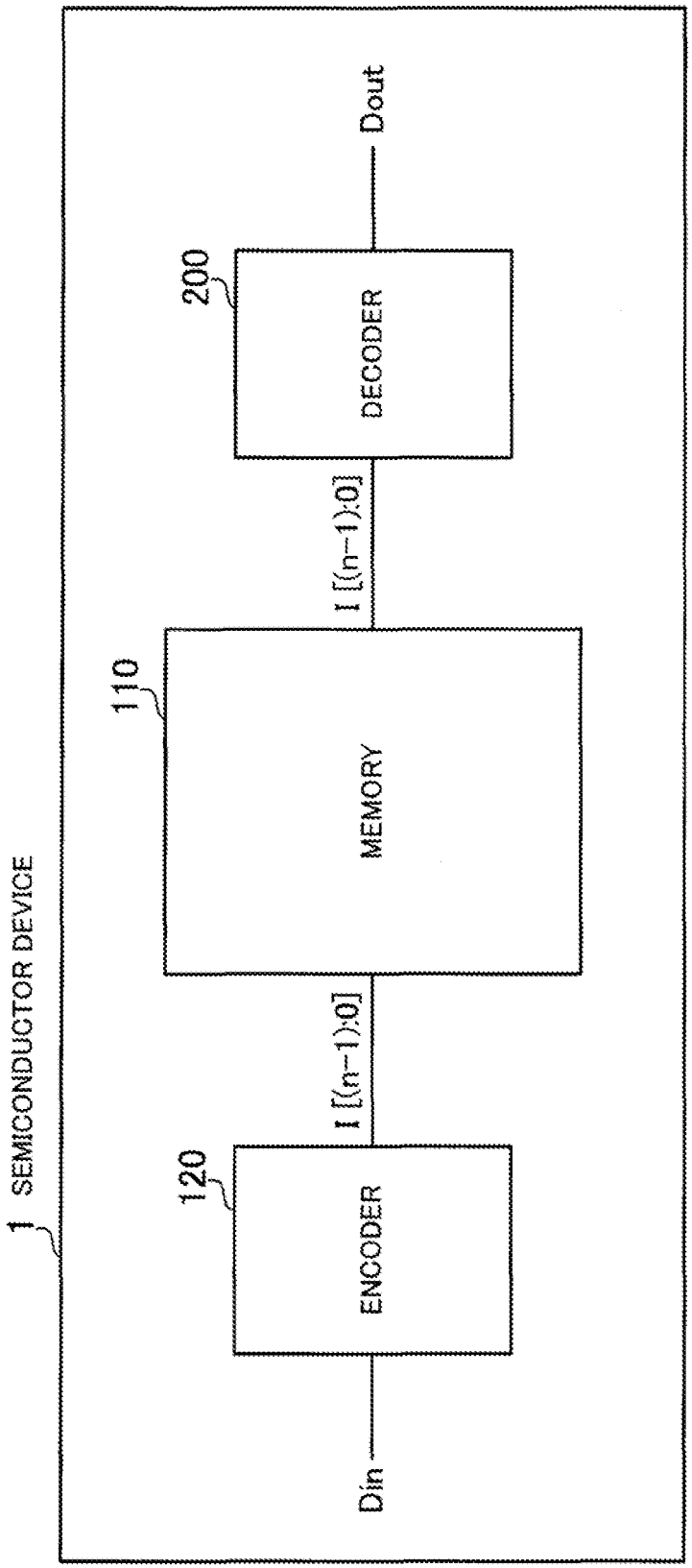
FIG. 1 illustrates an example configuration of a semiconductor device according to a first embodiment.

Several embodiments will be described below with reference to the accompanying drawings, wherein like reference numerals refer to like elements throughout.

First Embodiment

FIG. 1 illustrates an example configuration of a semiconductor device according to a first embodiment. A semiconductor device 1 illustrated in FIG. 1 includes a memory 110, an encoder 120, and a decoder 200.

The memory 110 is a memory circuit that stores data, and may be, for example, a volatile memory such as a dynamic random-access memory (DRAM) and a static RAM (SRAM) or a nonvolatile memory such as a flash memory.

The encoder 120 converts input data Din into encoded data I, and outputs the encoded data I to the memory 110. The encoder 120 generates n-bit encoded data I[(n−1):0], where n is an integer larger than or equal to 4, by making the value of a bit of the input data Din redundant. Herein, the value of each bit of the encoded data I is not predetermined, and is determined in accordance with the value of the input data Din. For example, the encoder 120 outputs the encoded data I that stores the same value as the input data Din in each of the n bits.

The decoder 200 detects errors in the encoded data I output from the memory 110, and outputs output data Dout on the basis of the results of error detection. The decoder 200 detects and corrects a single-bit error, and detects a double-bit error in the encoded data I. The decoder 200 outputs the output data Dout that agrees with the original input data Din at least when no error occurs in any bits of the encoded data I and when an error occurs in a bit of the encoded data I.

Since the decoder 200 corrects a single-bit error, output data Dout having the same value as that of the input data Din is reliably output even if a bit error, i.e., reading of an incorrect value from the memory, occurs in one of the n bits due to, for example, failure of memory cells in the memory 110. That is, recording of the encoded data I, converted from the input data Din by the encoder 120, in the memory 110 and outputting of the output data Dout from the decoder 200 on the basis of the encoded data I read from the memory 110 improve reliability of data written to and read from the memory 110.

The decoder 200 may be provided for another semiconductor device that does not include the memory 110. Similarly, the encoder 120 may be provided for another semiconductor device that does not include the memory 110.

Figure 2:
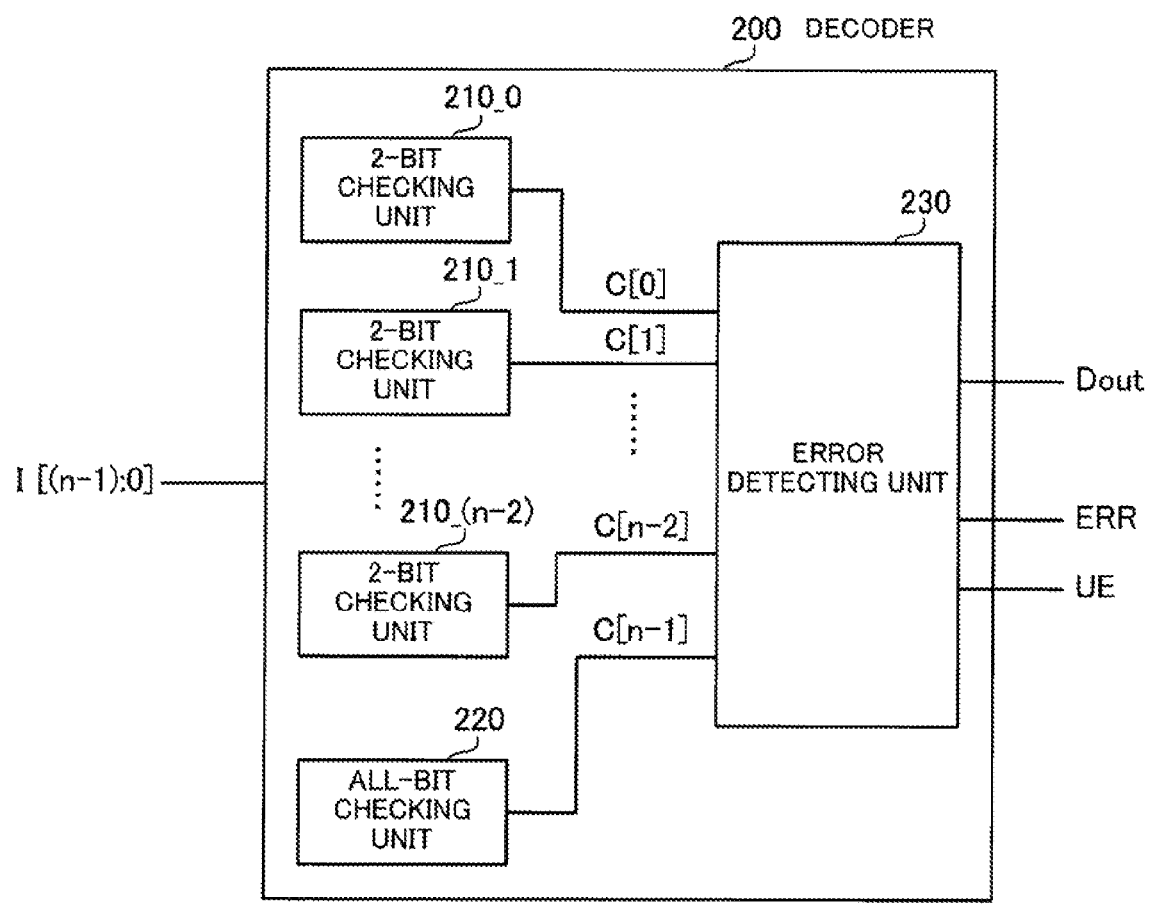
FIG. 2 illustrates an example internal configuration of a decoder.

FIG. 2 illustrates an example internal configuration of the decoder. The decoder 200 includes (n−1) 2-bit checking units 210_0 to 210_(n−2), an all-bit checking unit 220, and an error detecting unit 230. Each of the 2-bit checking units 210_0 to 210_(n−2) receives values of two bits of the encoded data I, combinations of the two bits differing for each 2-bit checking unit. Each of the 2-bit checking units 210_0 to 210_(n−2) outputs 2-bit check data based on a result of comparison between the values of the two input bits.

Each of the 2-bit checking units 210_0 to 210_(n−2), for example, outputs a value based on an exclusive OR of the values of the two input bits as 2-bit check data. Alternatively, at least one of the 2-bit checking units 210_0 to 210_(n−2) may output 2-bit check data on the basis of an exclusive OR of the value of one of the two input bits and an inverted value of the other bit. Furthermore, at least one of the 2-bit checking units 210_0 to 210_(n−2) may output an inverted value of the result of an exclusive OR as 2-bit check data.

The all-bit checking unit 220 outputs all-bit check data based on exclusive ORs of all input bits of the encoded data I. The term "exclusive ORs of all bits" herein refers to a sequential operation of exclusive ORs of two values. The sequential operation may be performed by, for example, computing an exclusive OR of a first bit and a second bit, and then computing an exclusive OR of the result and a third bit. The all-bit checking unit 220 outputs, for example, the result of the exclusive ORs of all bits of the encoded data I or an inverted value of the result as all-bit check data.

The error detecting unit 230 detects errors in the encoded data I on the basis of the (n−1) sets of the 2-bit check data output from the 2-bit checking units 210_0 to 210_(n−2) and the all-bit check data output from the all-bit checking unit 220. For example, the error detecting unit 230 may determine the existence of up to two error bits of the encoded data I from the combination of the values of the (n−1) sets of the 2-bit check data. Furthermore, the error detecting unit 230 may determine the occurrence of a single-bit error and the position of the error bit from the combination of the values of the (n−1) sets of the 2-bit check data and the value of the all-bit check data. When a single-bit error is detected, for example, the error detecting unit 230 may output the same value as the original input data Din as the output data Dout on the basis of the values of the bits other than the error bit in the encoded data I.

In addition, the error detecting unit 230 may determine, for example, whether or not the number of error bits is one on the basis of the value of the all-bit check data from the all-bit checking unit 220 if the existence of error bits is detected from the combination of the values of the (n−1) sets of the 2-bit check data. Since it may be determined whether or not the number of error bits is one not from n-bit data including the (n−1) sets of the 2-bit check data and the all-bit check data but from the all-bit check data of one bit in this case, the configuration of circuits for the determination may be simplified, and the scale of the circuits may be reduced.

In this embodiment, n-bit check code C, storing the 2-bit check data output from each of the 2-bit checking units 210_0 to 210_(n−2) and the all-bit check data output from the all-bit checking unit 220 in the order from the lowest bit to the highest, is input to the error detecting unit 230 as illustrated in FIG. 2.

In addition, the error detecting unit 230 outputs an error notification signal ERR indicating whether or not an error occurs and an error notification signal UE indicating whether or not the error is uncorrectable in addition to the output data Dout. A signal processor (not illustrated) that receives the output data Dout from the decoder 200 may recognize that the value of the output data Dout is correct when the error notification signal ERR is "0" that indicates the non-occurrence of errors or when the error notification signal ERR is "1" that indicates the occurrence of errors and the error notification signal UE is "0" that indicates a correctable error, i.e., a single-bit error.

Next, example processes performed by the encoder 120 and the decoder 200 and example internal configurations of related components will be described. As an example, n is 4 in the following description.

Encoding Example 1

Figure 3:
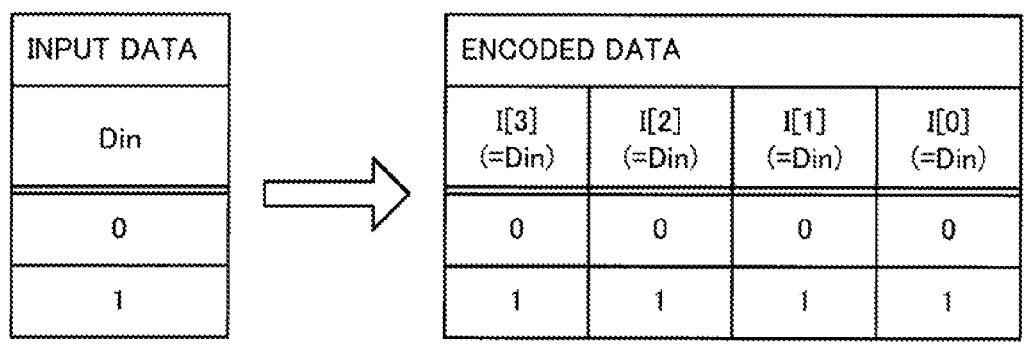
FIG. 3 illustrates the relationship between input data and encoded data in Encoding Example 1.

FIG. 3 illustrates the relationship between input data and encoded data in Encoding Example 1.

In Encoding Example 1, the same value as the input data Din is stored in each of the four bits of the encoded data I. For example, the encoded data I is "0000" when the input data Din is "0", and the encoded data I is "1111" when the input data Din is "1". Herein, the Hamming distance between the two possible values "0000" and "1111" of the encoded data I is "4". When the Hamming distance is "4", the maximum number of bits whose errors are detectable is 4/2=2, and the maximum number of bits whose errors are correctable is 4/2−1=1. That is, in order to correct a single-bit error, the smallest number n of bits of the encoded data is 4, which allows the Hamming distance to be larger than or equal to 4.

Figure 4:
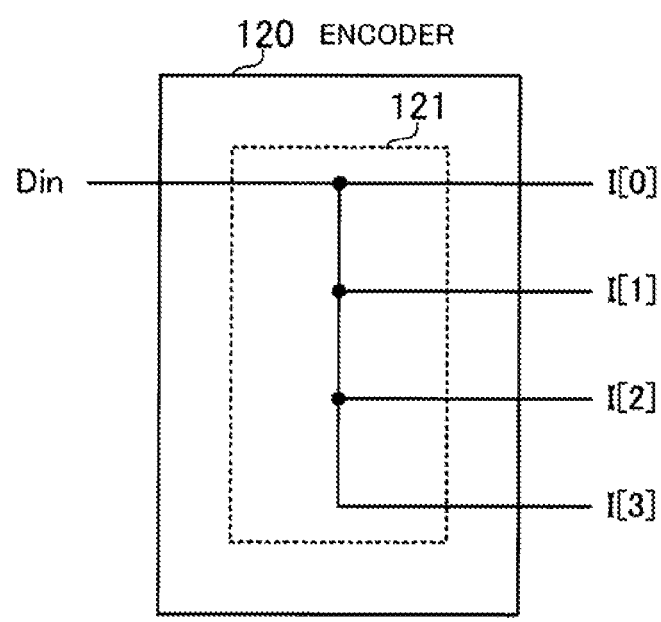
FIG. 4 illustrates an example circuit configuration of an encoder that implements Encoding Example 1.

FIG. 4 illustrates an example circuit configuration of an encoder that implements Encoding Example 1.

The encoder 120 illustrated in FIG. 4 includes, for example, a branch circuit 121 that branches the input data Din into four. This allows the encoder 120 to convert data as illustrated in FIG. 3.

Encoding Example 2

Figure 5:
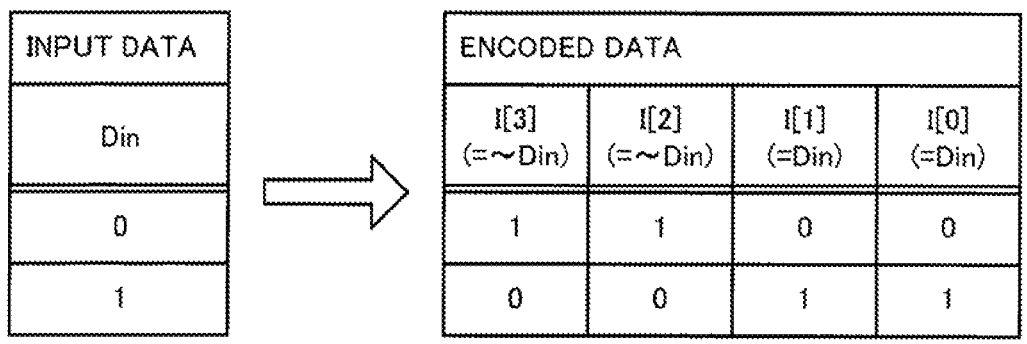
FIG. 5 illustrates the relationship between input data and encoded data in Encoding Example 2.

FIG. 5 illustrates the relationship between input data and encoded data in Encoding Example 2.

In Encoding Example 2, the same value as the input data Din is stored in the lower two bits of the 4-bit encoded data I, and the inverted value of the input data Din is stored in the upper two bits. For example, the encoded data I is "1100" when the input data Din is "0", and the encoded data I is "0011" when the input data Din is "1". Herein, the Hamming distance between the two possible values "1100" and "0011" of the encoded data I is "4" as in Encoding Example 1.

The encoded data I generated as illustrated in FIG. 5 allows the decoder 200 to correctly detect errors even if, for example, the values in all memory cells in the memory 110 turn into "0" or "1" due to, for example, some failure of the memory 110. In cases where the encoded data I as illustrated in FIG. 3 is generated, for example, it is not determined whether or not the value of the encoded data I is correct when "0000" is read from the memory 110 as the encoded data I. In contrast, in cases where the encoded data I is generated as illustrated in FIG. 5, it is determined that the encoded data I is not correct when the "0000" is read from the memory. Similar effects may be produced when the encoded data I stores the same value as the input data Din in at least one of the four bits and the inverted value of the input data Din in at least one of the four bits.

Figure 6:
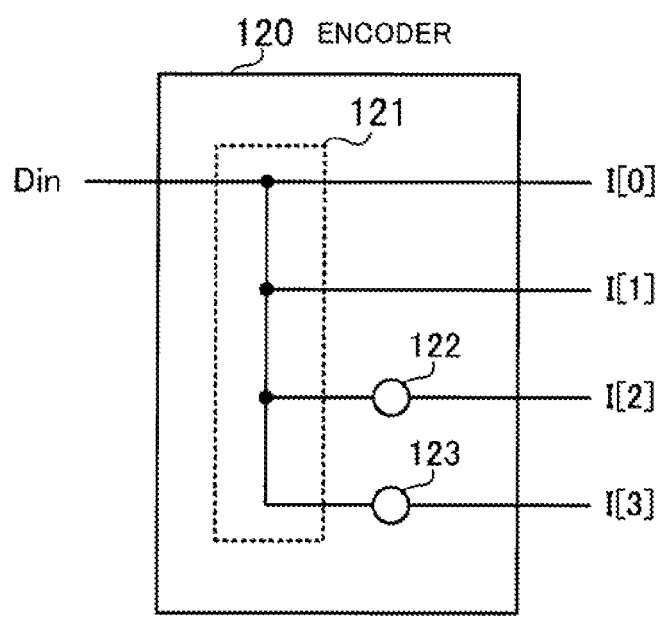
FIG. 6 illustrates an example circuit configuration of an encoder that implements Encoding Example 2.

FIG. 6 illustrates an example circuit configuration of an encoder that implements Encoding Example 2. In FIG. 6, the same reference numerals and symbols are used for components corresponding to those illustrated in FIG. 4.

The encoder 120 illustrated in FIG. 6 includes, for example, the branch circuit 121 that branches the input data Din into four and inverters 122 and 123 each inverting one of the four values output from the branch circuit 121. This allows the encoder 120 to convert data as illustrated in FIG. 5.

Decoding Example 1

FIGS. 7 and 8 illustrate the relationships among input data, check codes, and decoder outputs in Decoding Example 1.

In Decoding Example 1, it is assumed that the encoded data I is generated as in Encoding Example 1 illustrated in FIG. 3. In the example calculation illustrated in FIG. 7, the original input data Din is "0", and the encoded data I generated by the encoder 120 is "0000". Meanwhile, in the example calculation illustrated in FIG. 8, the original input data Din is "1", and the encoded data I generated by the encoder 120 is "1111". In the following description, a symbol "^" indicates an exclusive OR operation, and characters "0x" are the prefix for hexadecimal numbers.

In Decoding Example 1, each of the four bits of the check code C is calculated as follows on the basis of the 4-bit encoded data I input to the decoder 200. Herein, C[0] to C[2] correspond to the 2-bit check data, and C[3] corresponds to the all-bit check data.

$$C[0]=I[0]\^I[1] \quad (1)$$

$$C[1]=I[1]\^I[2] \quad (2)$$

$$C[2]=I[2]\^I[3] \quad (3)$$

$$C[3]=I[0]\^I[1]\^I[2]\^I[3] \quad (4)$$

As illustrated in FIGS. 7 and 8, the check code C is "0x0" when no bit error occurs in the encoded data I. In contrast, when a single-bit or double-bit error occurs in the encoded data I, the value of the check code C is other than "0x0". This allows the decoder 200 to determine the occurrence of a single-bit or double-bit error from the check code C. The error detecting unit 230 (see FIG. 2) of the decoder 200 sets "0" to the error notification signal ERR when the check code C is "0x0", and sets "1" when the check code C is other than "0x0".

In addition, from Expression (4), the C[3] bit of the check code C indicates the parity of the number of "1" in the encoded data I input to the decoder 200. Therefore, the value of C[3] differs when a single-bit error occurs and when a double-bit error occurs. This allows the decoder 200 to determine whether the detected error is a single-bit error or a double-bit error from the value of C[3] when the error notification signal ERR is "1". The error detecting unit 230 of the decoder 200 sets "0" that indicates correctable errors to the error notification signal UE when the error notification signal ERR is "1" and C[3] is "1", and sets "1" that indicates uncorrectable errors to the error notification signal UE when C[3] is "0".

Furthermore, when a single-bit error occurs in the encoded data I, the value of the check code C varies depending on the position of the error bit as illustrated in FIGS. 7 and 8. This allows the decoder 200 to determine the position of the error bit in the encoded data I from the value of the check code C when a single-bit error occurs.

The decoder 200 sets the value of a bit of the encoded data I, no error occurring in the bit, as the output data Dout on the basis of the result of determination of the error position. In the examples illustrated in FIGS. 7 and 8, the error detecting unit 230 of the decoder 200 sets the value of I[1] bit of the encoded data I as the output data Dout when the check code is "0x9", and sets the value of I[0] bit of the encoded data I as the output data Dout when the check code is other than "0x9".

As illustrated in FIGS. 7 and 8, the above-described relationships between the encoded data I and the check code C hold when the encoded data I generated by the encoder 120 is "0000" or "1111". Therefore, detection of errors in up to two bits and correction of a single-bit error are correctly performed even if the output from the memory cells is changed from "0" to "1" or from "1" to "0" in Decoding Example 1.

Figure 9:
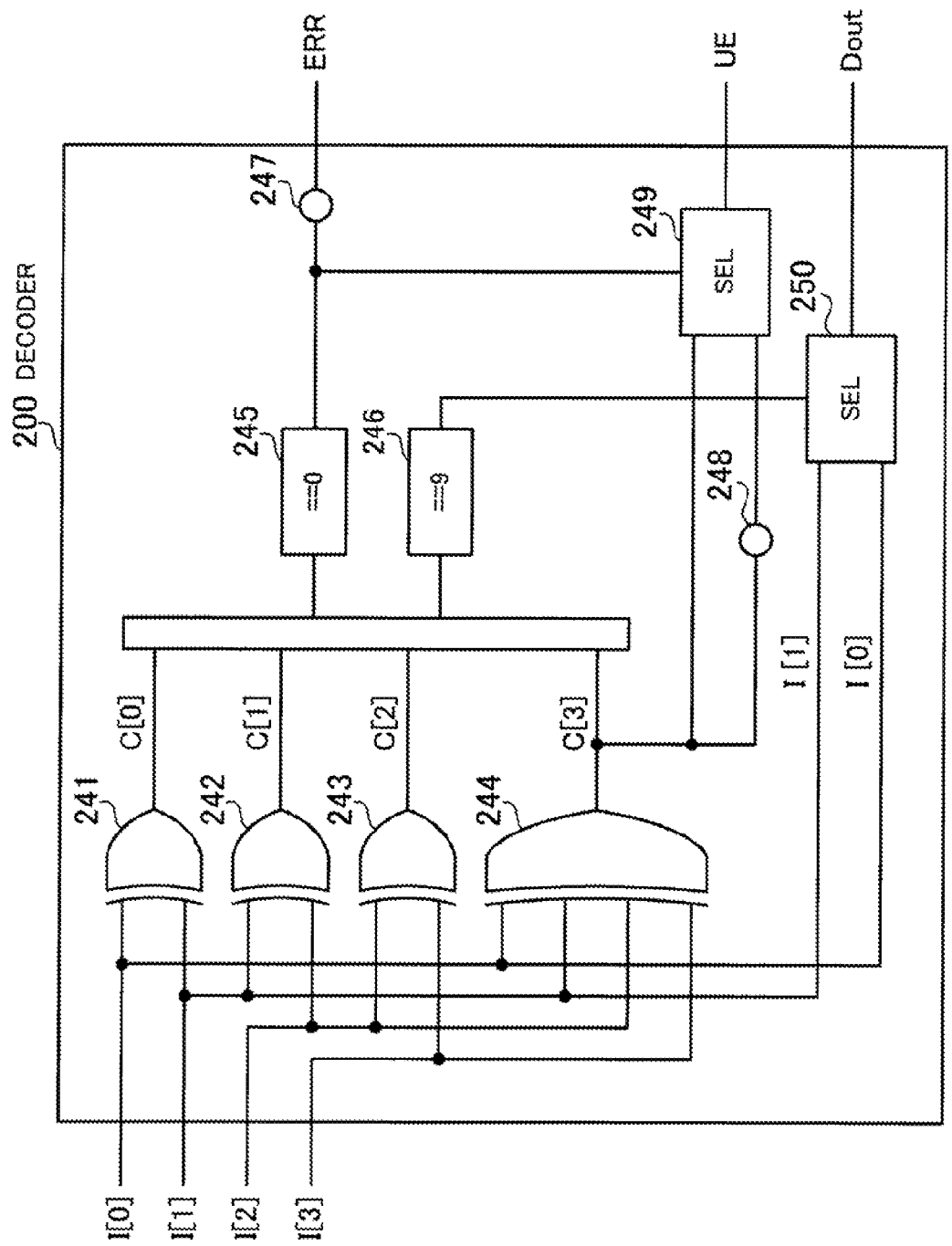
FIG. 9 illustrates an example circuit configuration of a decoder that implements Decoding Example 1.

FIG. 9 illustrates an example circuit configuration of a decoder that implements Decoding Example 1. The decoder 200 illustrated in FIG. 9 includes XOR (exclusive OR) gates 241 to 244, comparators 245 and 246, inverters 247 and 248, and selectors 249 and 250.

The XOR gates 241 to 243 correspond to, for example, 2-bit checking units 210_0 to 210_2, respectively, among the 2-bit checking units illustrated in FIG. 2. The XOR gates 241 to 243 evaluate Expressions (1) to (3), respectively. The XOR gate 244 corresponds to the all-bit checking unit 220 illustrated in FIG. 2. The XOR gate 244 evaluates Expression (4).

The comparator 245 and the inverter 247 are circuits that determine the occurrence of errors in the encoded data I. The comparator 245 outputs "1" when the check code C output from XOR gates 241 to 244 is "0x0", and outputs "0" when the check code C is other than "0x0". The inverter 247 inverts the value output from the comparator 245, and outputs the inverted value as the error notification signal ERR.

The comparator 246 and the selector 250 are circuits for outputting the output data Dout on the basis of the check code C. The comparator 246 outputs "1" when the check code C is "0x9", and outputs "0" when the check code C is other than "0x9". The selector 250 selects the value of I[0] or I[1] bit of the encoded data I in accordance with the value output from the comparator 246, and outputs the selected value as the output data Dout. The selector 250 outputs the value of I[1] when the value output from the comparator 246 is "1", and outputs the value of I[0] when the value output from the comparator 246 is "0".

The inverter 248, the selector 249, and the comparator 245 constitute a circuit for generating the error notification signal UE. The inverter 248 inverts the value of C[3] from the XOR gate 244. The selector 249 selects the value of C[3] from the XOR gate 244 or the value output from the inverter 248 in accordance with the value output from the comparator 245, and outputs the selected value as the error notification signal UE. The selector 249 outputs the value of C[3] from the XOR gate 244 when the value output from the comparator 245 is "1", that is, when the check code C is "0x0". When the value output from the comparator 245 is "0", that is, when the check code C is other than "0x0", the selector 249 outputs the value output from the inverter 248.

The circuit configuration as illustrated in FIG. 9 leads to the relationships between the input encoded data I and the values output from the decoder 200 as illustrated in FIGS. 7 and 8.

An example of encoding and decoding when n=3 will now be described for comparison. Herein, the encoded data I is "000" when the input data Din input to the encoder 120 is "0", and the encoded data I is "111" when the input data Din is "1". In this case, the Hamming distance between "000" and "111" is "3", and the maximum number of bits whose errors are correctable is 3/2−1=0.5. Accordingly, a single-bit error is not corrected when n=3. This is clear from example calculations illustrated in FIGS. 10 and 11.

FIGS. 10 and 11 illustrate example calculations by the decoder when n=3.

In the example calculations by the decoder 200 illustrated in FIGS. 10 and 11, C[0] and C[1] of 3-bit check code C are calculated using Expressions (1) and (2), respectively, and C[2] is calculated using the following Expression (5).

$$C[2]=I[0]\textasciicircum I[1]\textasciicircum I[2] \quad (5)$$

In the example calculations illustrated in FIGS. 10 and 11, the value of the check code C when a single-bit error occurs becomes the same as that of the check code C when a double-bit error occurs in some cases. For example, the check code C when an error occurs in the I[2] bit is the same as that when two errors occur in the I[0] and I[1] bits. In addition, the value of C[3] when a single-bit error occurs and that when a double-bit error occurs become the same. As a result, single-bit errors and double-bit errors are indiscriminable, and furthermore, the positions of the error bits are not identifiable in the example calculations illustrated in FIGS. 10 and 11. Accordingly, single-bit errors are not correctable in the example calculations illustrated in FIGS. 10 and 11.

Decoding Example 2

FIGS. 12 and 13 illustrate the relationships among input data, check codes, and decoder outputs in Decoding Example 2.

In Decoding Example 2, it is assumed that the encoded data I is generated as in Encoding Example 2 illustrated in FIG. 5. In the example calculation illustrated in FIG. 12, the original input data Din is "0", and the encoded data I generated by the encoder 120 is "1100". In the example calculation illustrated in FIG. 13, the original input data Din is "1", and the encoded data I generated by the encoder 120 is "0011". In Decoding Example 2, the check code C is calculated, as illustrated in FIGS. 12 and 13, using Expressions (1) to (4) as in Decoding Example 1.

As in Decoding Example 1, the value of the check code C differs when no bit error occurs in the encoded data I and when a single-bit or double-bit error occurs in the encoded data I in Decoding Example 2. This allows the decoder 200 to determine the occurrence of a single-bit or double-bit error from the check code C. The error detecting unit 230 (see FIG. 2) of the decoder 200 sets the error notification signal ERR to "0" when the check code C is "0x2", and sets the error notification signal ERR to "1" when the check code C is other than "0x2".

In Decoding Example 2, the value of C[3] differs when a single-bit error occurs and when a double-bit error occurs as in Decoding Example 1. This allows the decoder 200 to determine that the detected error is a single-bit error or a double-bit error from the value of C[3] when the error notification signal ERR is "1". In Decoding Example 2, the error notification signal UE is output on the basis of the value of C[3] as in Decoding Example 1.

Furthermore, when a single-bit error occurs in the encoded data I, the value of the check code C varies depending on the position of the error bit in Decoding Example 2 as in Decoding Example 1. This allows the decoder 200 to determine the position of the error bit in the encoded data I from the value of the check code C when a single-bit error occurs.

The decoder 200 sets the value of a bit of the encoded data I, no error occurring in the bit, as the output data Dout on the basis of the result of determination of the error position. In the example illustrated in FIGS. 12 and 13, the error detecting unit 230 of the decoder 200 sets the value of I[1] bit of the encoded data I as the output data Dout when the check code is "0xB", and sets the value of I[0] bit of the encoded data I as the output data Dout when the check code is other than "0xB".

In Decoding Example 2, error detection and correction performed on the basis of the encoded data I generated through the procedure in Encoding Example 2 allows the decoder 200 to correctly detect errors even if, for example, the values in all memory cells in the memory 110 turn into "0" or "1" due to, for example, failure of the memory cells. That is, the input encoded data I is "1100" or "0011" when no error bit exists in Decoding Example 2. If all memory cells in the memory 110 turn into "0" or "1", the input encoded data I will be "0000" or "1111", respectively. This allows the decoder 200 to detect the occurrence of errors.

As illustrated in FIGS. 12 and 13, the above-described relationships between the encoded data I and the check code C hold when the encoded data I generated by the encoder 120 is "1100" or "0011". Therefore, detection of errors in up to two bits and correction of a single-bit error are also correctly performed even if the output from the memory cells is changed from "0" to "1" or from "1" to "0" in Decoding Example 2.

FIG. 14 illustrates an example circuit configuration of a decoder that implements Decoding Example 2. In FIG. 14, the same reference numerals and symbols are used for components corresponding to those illustrated in FIG. 9. The decoder 200 illustrated in FIG. 14 is similar to the decoder 200 illustrated in FIG. 9 except for including comparators 251 and 252 instead of the comparators 245 and 246.

The comparator 251 outputs "1" when the check code C output from the XOR gates 241 to 244 is "0x2", and outputs "0" when the check code C is other than "0x2". As a result, the error notification signal ERR becomes "0" when the check code C is "0x2", and becomes "1" when the check code C is other than "0x2". The selector 249 outputs the value of C[3] from the XOR gate 244 when the value output from the comparator 251 is "1", that is, when the check code C is "0x2". When the value output from the comparator 251 is "0", that is, when the check code C is other than "0x2", the selector 249 outputs the value output from the inverter 248.

The comparator 252 outputs "1" when the check code C is "0xB", and outputs "0" when the check code C is other than "0xB". As a result, the selector 250 outputs the value of I[1] when the value output from the comparator 252 is "1", that is, when the check code C is "0xB" while outputting the value of I[0] when the value output from the comparator 252 is "0", that is, when the check code C is other than "0xB".

The circuit configuration as illustrated in FIG. 14 leads to the relationships between the input encoded data I and the values output from the decoder 200 as illustrated in FIGS. 12 and 13.

Decoding Example 3

FIGS. 15 and 16 illustrate the relationships among input data, check codes, and decoder outputs in Decoding Example 3.

In Decoding Example 3, it is assumed that the encoded data I is generated as in Encoding Example 1 illustrated in FIG. 3. In the example calculation illustrated in FIG. 15, the original input data Din is "0", and the encoded data I generated by the encoder 120 is "0000". In the example calculation illustrated in FIG. 16, the original input data Din is "1", and the encoded data I generated by the encoder 120 is "1111".

In Decoding Examples 1 and 2, the value of the 4-bit check code C is compared with a predetermined value so that signals to be output from the decoder 200 are generated. In contrast, a computational expression for check code generation is selected in Decoding Example 3 so that comparison with the 4-bit value is performed only one time. This may reduce processing loads on the decoder 200, and may reduce the scale of the circuits.

In Decoding Example 3, each of the four bits of the check code C is calculated as below on the basis of the encoded data I input to the decoder 200. Herein, a symbol "~" indicates an inversion (negation) operation.

$$C[0] = \sim(I[0] \cdot I[1]) \quad (6)$$

$$C[1] = \sim(I[0] \cdot I[2]) \quad (7)$$

$$C[2] = \sim(I[1] \cdot I[2]) \quad (8)$$

$$C[3] = \sim(I[0] \cdot I[1] \cdot I[2] \cdot I[3]) \quad (9)$$

In Decoding Example 3, the value of the check code C differs when no bit error occurs in the encoded data I and when a single-bit or double-bit error occurs in the encoded data I as in Decoding Examples 1 and 2. This allows the decoder 200 to determine the occurrence of a single-bit or double-bit error from the check code C. The error detecting unit 230 (see FIG. 2) of the decoder 200 sets the error notification signal ERR to "0" when the check code C is "0xF", and sets the error notification signal ERR to "1" when the check code C is other than "0xF".

In Decoding Example 3, the value of C[3] differs when a single-bit error occurs and when a double-bit error occurs as in Decoding Examples 1 and 2. This allows the decoder 200 to determine that the detected error is a single-bit error or a double-bit error from the value of C[3] when the error notification signal ERR is "1". In Decoding Example 3, the error notification signal UE is output on the basis of the value of C[3] as in Decoding Examples 1 and 2.

Furthermore, when a single-bit error occurs in the encoded data I, the value of the check code C varies depending on the position of the bit error in Decoding Example 3 as in Decoding Examples 1 and 2. This allows the decoder 200 to determine the position of the error bit in the encoded data I from the value of the check code C when a single-bit error occurs.

The decoder 200 sets the value of a bit of the encoded data I, no error occurring in the bit, as the output data Dout on the basis of the result of determination of the error position. In Decoding Example 3, the source of the output data Dout is selected on the basis of the value of one of C[0] to C[2] bits unlike Decoding Examples 1 and 2. In the examples illustrated in FIGS. 15 and 16, the error detecting unit 230 of the decoder 200 sets the value of I[1] as the output data Dout when C[2] is "1", and sets the value of I[0] as the output data Dout when C[2] is "0".

As illustrated in FIGS. 15 and 16, the above-described relationships between the encoded data I and the check code C hold when the encoded data I generated by the encoder 120 is "0000" or "1111". Therefore, detection of errors in up to two bits and correction of a single-bit error are also correctly performed even if the output from the memory cells is changed from "0" to "1" or from "1" to "0" in Decoding Example 3.

Figure 17:
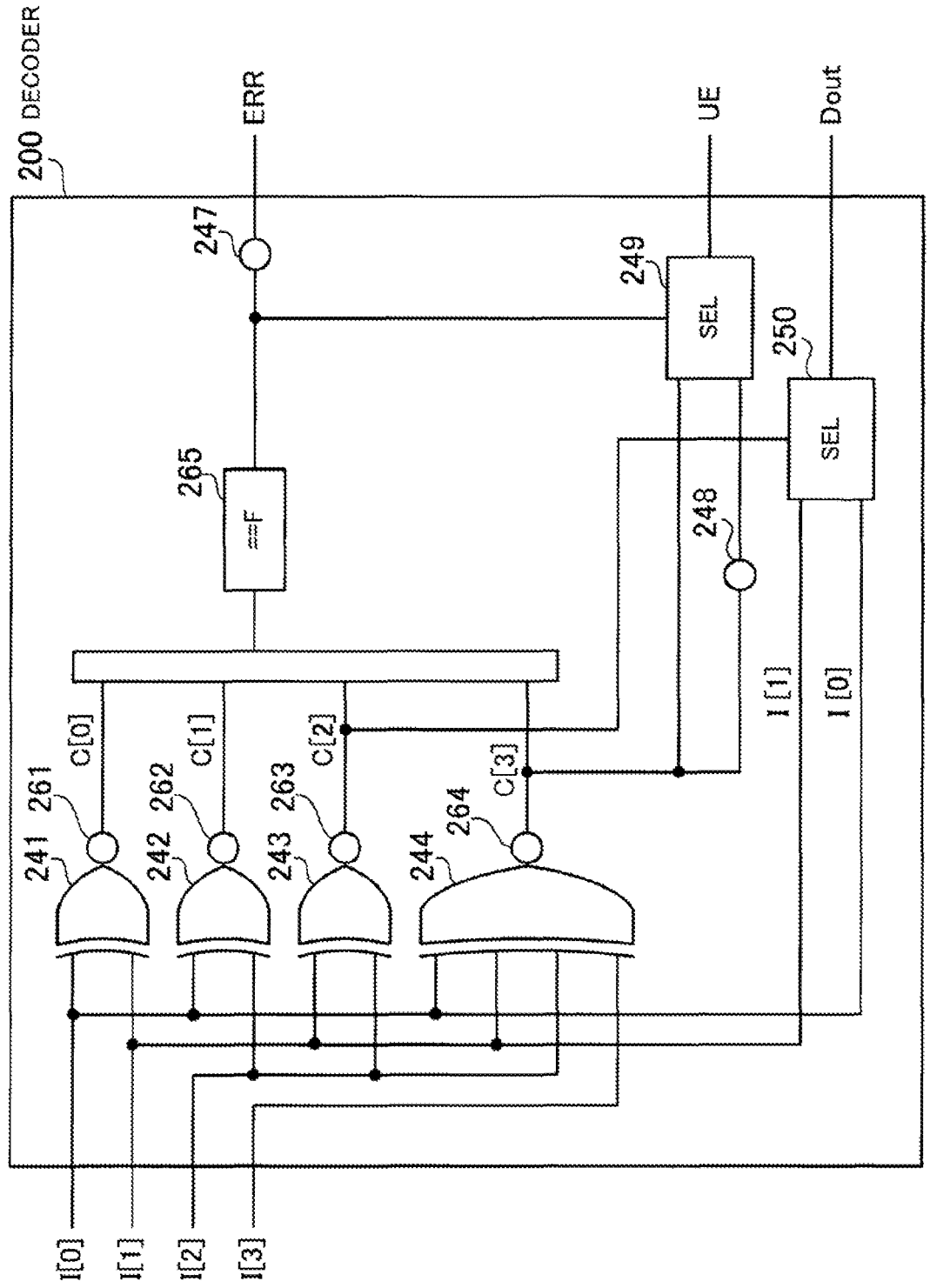
FIG. 17 illustrates an example circuit configuration of a decoder that implements Decoding Example 3.

FIG. 17 illustrates an example circuit configuration of a decoder that implements Decoding Example 3. In FIG. 17, the same reference numerals and symbols are used for components corresponding to those illustrated in FIG. 9. The decoder 200 illustrated in FIG. 17 is similar to the decoder 200 illustrated in FIG. 9 except for not including the comparator 246 and including inverters 261 to 264. The decoder 200 illustrated in FIG. 17 also includes a comparator 265 instead of the comparator 245 illustrated in FIG. 9. Furthermore, the combinations of signals input to the XOR gates 242 and 243 and the source of a selection control signal to the selector 250 differ from those in the decoder 200 illustrated in FIG. 9.

The values of I[0] and I[2] bits of the encoded data I are input to the XOR gate 242, and the values of I[1] and I[2] bits of the encoded data I are input to the XOR gate 243. The inverters 261 to 264 invert the values output from the XOR gates 241 to 244, respectively. The values output from the inverters 261 to 264 correspond to C[0] to C[3], respectively.

The comparator 265 outputs "1" when the check code C output from the inverters 261 to 264 is "0xF", and outputs "0" when the check code C is other than "0xF". The inverter 247 inverts the value output from the comparator 265, and outputs the inverted value as the error notification signal ERR.

The selector 249 receives a signal output from the comparator 265 as a selection control signal. The selector 249 outputs C[3] from the inverter 264 as the error notification signal UE when the value output from the comparator 265 is "1", and outputs the value output from the inverter 248 as the error notification signal UE when the value output from the comparator 265 is "0".

The selector 250 receives C[2] from the inverter 263 as the selection control signal. The selector 250 outputs the value of I[1] as the output data Dout when C[2] is "1", and outputs the value of I[0] when C[2] is "0".

The circuit configuration as illustrated in FIG. 17 leads to the relationships between the input encoded data I and the values output from the decoder 200 as illustrated in FIGS. 15 and 16. Although the inverters 261 to 264 are added, the circuit configuration illustrated in FIG. 17 does not need the comparators 246 and 252 for comparing the values of four bits illustrated in, for example, FIGS. 9 and 14, respectively. This may reduce the entire circuit scale.

The scale of the circuits may also be reduced when other computational methods are used instead of the method of computing the check code C used in Decoding Example 3. That is, the scale of the circuits may be reduced by adopting a method of computing C[0] to C[2] such that a bit, no error occurring in the bit, of the encoded data I is selected in accordance with one of the values of C[0] to C[2]. The method of computing C[0] to C[2] may be changed by, for example, changing the combinations of bits of the encoded data I to be subjected to exclusive OR operations, changing the results of exclusive OR operations (C[0] to C[2]) to be inverted, and computing exclusive ORs of two bits of the encoded data I after either or both of the two bits are inverted.

Example of Symbol-by-Symbol Encoding and Decoding

In addition to bit-by-bit error detection and correction of the input data Din described in the encoding and decoding examples above, errors may also be detected and corrected multiple bits at a time. As an example, symbol-by-symbol error detection and correction, eight bits for one 8-bit symbol, will be described below.

Figure 18:
FIG. 18 illustrates an example of symbol-by-symbol encoding.

FIG. 18 illustrates an example of symbol-by-symbol encoding.

In the example illustrated in FIG. 18, an 8-bit symbol of the input data Din is converted into 32-bit encoded data I by the encoder 120. The encoded data I consists of I0 to I3 in the order from the lowest bit to the highest, and each of I0 to I3 consists of eight bits. In the example illustrated in FIG. 18, the value of each bit of the symbol of the input data Din is stored in the I0 and I1 without being changed while an inverted value is stored in I2 and I3. This encoding process may be performed by, for example, the encoder 120 having the configuration illustrated in FIG. 6. In this case, the encoder 120 illustrated in FIG. 6 outputs I0 to I3 instead of I[0] to I[3].

I0 to I3 of the encoded data I generated by this process are decoded by the decoder 200. The decoding process may be performed as is the bit-by-bit decoding process. For example, C[0] to C[3] of the check code C are calculated by substituting I0 to I3 for I[0] to I[3] in Expressions (1) to (4), Expressions (1), (2), (5), and (4), or Expressions (6) to (9), respectively. When C[0] to C[3] are calculated using Expressions (1) to (4), respectively, the decoder 200 may have a configuration as illustrated in, for example, FIG. 9. In this case, the decoder 200 illustrated in FIG. 9 receives I0 to I3 instead of I[0] to I[3].

FIG. 19 illustrates examples of bit error patterns of encoded data encoded a symbol at a time. FIG. 19 illustrates the examples of the bit error patterns when "0x00" serving as the input data Din is encoded. I0 to I3 each consist of eight bits, and each of the eight bits is referred to as a "zeroth bit", a "first bit", ..., and a "seventh bit" from the lowest.

Bit error pattern 1 indicates a case where bit errors occur in all bits of one of I0 to I3. In the bit error pattern 1 illustrated in FIG. 19, bit errors occur in all bits of I3. In the decoder 200, error detection and correction is performed for each set of bits of I0 to I3 in the same bit position, that is, for each set of the zeroth bits, the first bits, ..., and the seventh bits. Therefore, when bit errors occur in all bits of I3 as in the bit error pattern 1, the decoder 200 determines that single-bit errors occur in all eight bit positions of I0 to I3. Since the decoder 200 corrects single-bit errors, the decoder 200 correctly outputs "0x00" as the output data Dout when bit errors as illustrated in the bit error pattern 1 occur.

Bit error pattern 2 illustrated in FIG. 19 indicates a case where only one bit error occurs in each set of the bits of I0 to I3 in the same bit position although bit errors occur in multiple bits of the encoded data I. In the bit error pattern 2 illustrated in FIG. 19, bit errors occur in the third and seventh bits of I0, the second and sixth bits of I1, the first and fifth bits of I2, and the zeroth and fourth bits of I3. In this case, the decoder 200 determines that single-bit errors occur in all eight bit positions of I0 to I3, and correctly outputs "0x00" as the output data Dout.

Bit error pattern 3 illustrated in FIG. 19 indicates a case where bit errors occur in all bits of two of I0 to I3. In the bit error pattern 3 illustrated in FIG. 19, bit errors occur in all bits of I2 and I3. In this case, the decoder 200 detects double-bit errors in all eight bit positions of I0 to I3. However, there is no guarantee that the output data Dout agrees with the original input data Din.

Bit error pattern 4 illustrated in FIG. 19 indicates a case where bit errors occur in multiple bits of the encoded data I and, at the same time, two bit errors occur in each set of the bits of I0 to I3 in the same bit position. In the bit error pattern 4 illustrated in FIG. 19, bit errors occur in the third bits of I0 and I1, the seventh bits of I0 and I1, the zeroth bits of I2 and I3, and the fourth bits of I2 and I3. In this case, the decoder 200 detects double-bit errors in the zeroth, third, fourth, and seventh bit positions of I0 to I3. However, there is no guarantee that the output data Dout agrees with the original input data Din.

According to the first embodiment, the decoder 200 detects errors of up to two bits of the encoded data I and corrects single-bit errors of the encoded data I. This allows the original data to be correctly read even if, for example, bit errors occur in one of every n bits in the memory 110.

In addition, the decoder 200 detects and corrects errors as above with a far simpler circuit configuration compared with that used for error detection and correction using ECC. Unlike the error detection and correction using ECC requiring complicated operations such as convolution operations, the decoder 200 performs decoding with simple operations using only, for example, XOR gates, comparators, and selectors.

For example, when a field-programmable gate array (FPGA) with look-up tables (LUTs) performs error detection and correction using 18-bit encoded data with ECC obtained by converting 12-bit data, the FPGA may use a circuit consisting of about 9 LUTs for encoding and a circuit consisting of about 53 LUTs for decoding. In contrast, when n=4 in the first embodiment, a FPGA provided with twelve encoders 120 and twelve decoders 200 may use only a circuit consisting of less than one LUT for encoding and a circuit consisting of about two LUTs for decoding.

That is, the encoder 120 and the decoder 200 according to the first embodiment perform double-bit error detection and single-bit error correction with simpler processes while using smaller-scale circuits compared with cases where ECC is used. As a result, processing speed is increased compared with error detection and correction using ECC.

Second Embodiment

Figure 20:
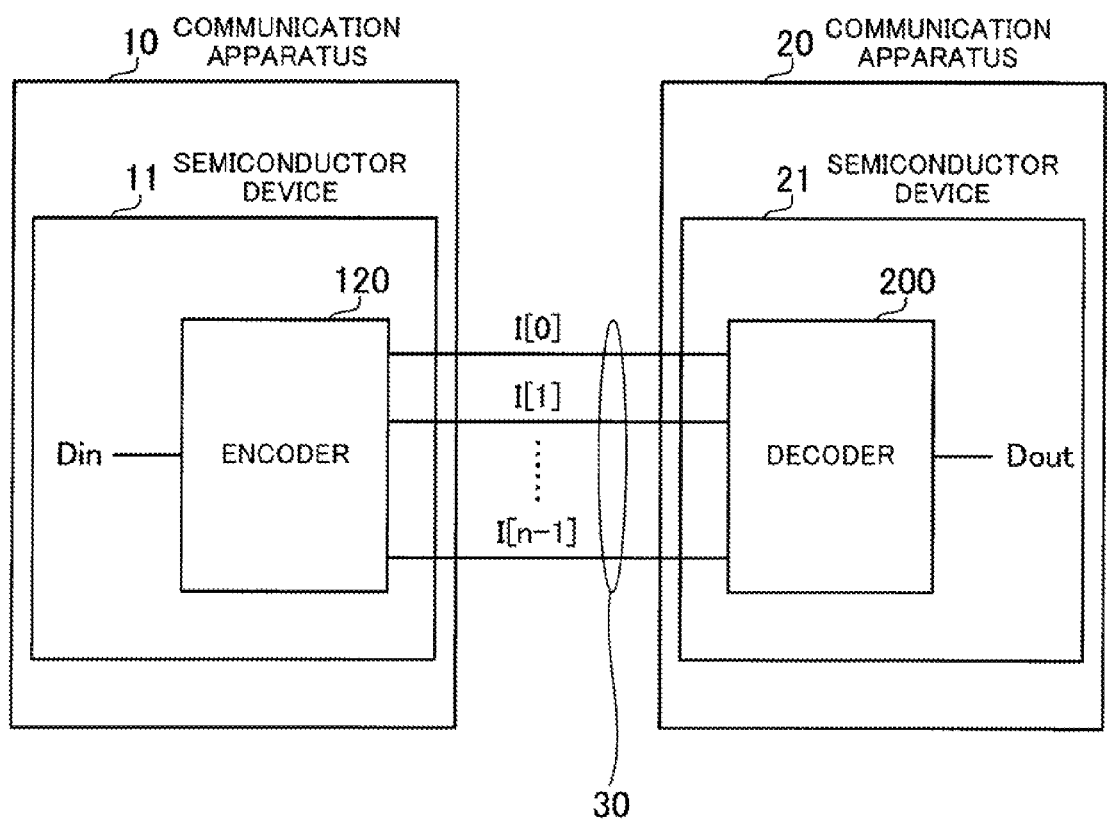
FIG. 20 illustrates an example configuration of a data transmission and reception system according to a second embodiment.

FIG. 20 illustrates an example configuration of a data transmission and reception system according to a second embodiment. In FIG. 20, the same reference numerals and symbols are used for components corresponding to those illustrated in FIG. 1.

The encoder 120 and the decoder 200 in the first embodiment may be used to transmit and receive data through buses in addition to reading from and writing to memories. In FIG. 20, a communication apparatus 10 includes a semiconductor device 11 provided with an encoder 120. Meanwhile, a communication apparatus 20 includes a semiconductor device 21 provided with a decoder 200. The communication apparatuses 10 and 20 are interconnected by a bus 30.

Input data Din to be transmitted from the communication apparatus 10 to the communication apparatus 20 is converted into n-bit encoded data I by the encoder 120. The encoded data I generated by the encoder 120 is transmitted to the communication apparatus 20 via the bus 30. The bus 30 may be a serial bus or a parallel bus.

The encoded data I received by the communication apparatus 20 is input to the decoder 200. The decoder 200 detects errors of up to two bits of the encoded data I, and corrects errors of up to one bit. Therefore, the decoder 200 reliably outputs the same value as the input data Din as output data Dout as long as the number of error bits of the encoded data I is up to 1.

The configuration as above increases the possibility that correct values are transmitted, and thereby improves reliability of signal transmission via the bus 30 even if the values of signals transmitted via the bus 30 are changed due to some failure.

For example, the encoder 120 and the decoder 200 may be included in the same communication apparatus. In this case, the bus 30 serves as an internal bus of the communication apparatus, and the reliability of signal transmission via the bus is improved. Furthermore, the encoder 120 and the decoder 200 may be included in the same semiconductor device.

Third Embodiment

Figure 21:
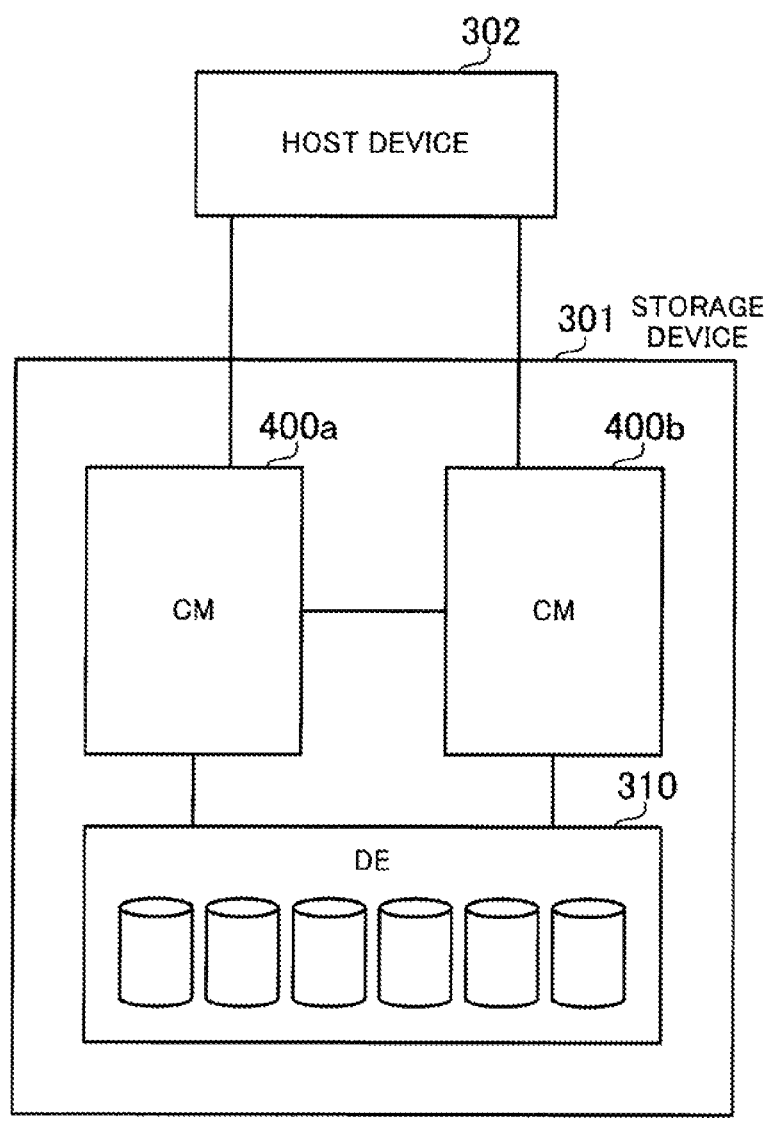
FIG. 21 illustrates an example system configuration of a storage system according to a third embodiment.

Next, a storage system provided with the encoder 120 and the decoder 200 will be described as a third embodiment. FIG. 21 illustrates an example system configuration of the storage system according to the third embodiment.

The storage system illustrated in FIG. 21 includes a storage device 301 and a host device 302. The storage device 301 and the host device 302 are interconnected via, for example, a Fibre Channel (FC) cable.

The storage device 301 includes a drive enclosure (DE) 310 and controller modules (CMs) 400a and 400b. The DE 310 includes a plurality of storages to be access-controlled by the CMs 400a and 400b. The storages included in the DE 310 are, for example, nonvolatile storages such as hard disk drives (HDDs) and solid state drives (SSDs). The storage device 301 may include a plurality of DEs 310. In addition, the DE 310 may be included in a casing other than that including the CMs 400a and 400b.

The CMs 400a and 400b manage physical storage areas implemented by the storages in the DE 310 using redundant arrays of inexpensive disks (RAID), and control accesses to the physical storage areas. In addition, the CMs 400a and 400b set logical volumes in the physical storage areas implemented by the storages in the DE 310, and access to the storages in the DE 310 in accordance with requests from the host device 302 for access to the logical volumes.

The storage device 301 may include three or more CMs. In this case, the system for controlling accesses to the DE 310 may become redundant, and reliability of access control process is improved.

The host device 302 requests accesses to the logical volumes from the CMs 400a and 400b in accordance with user operations. The host device 302 may be, for example, a computer provided with a central processing unit (CPU), a RAM, and the like.

Figure 22:
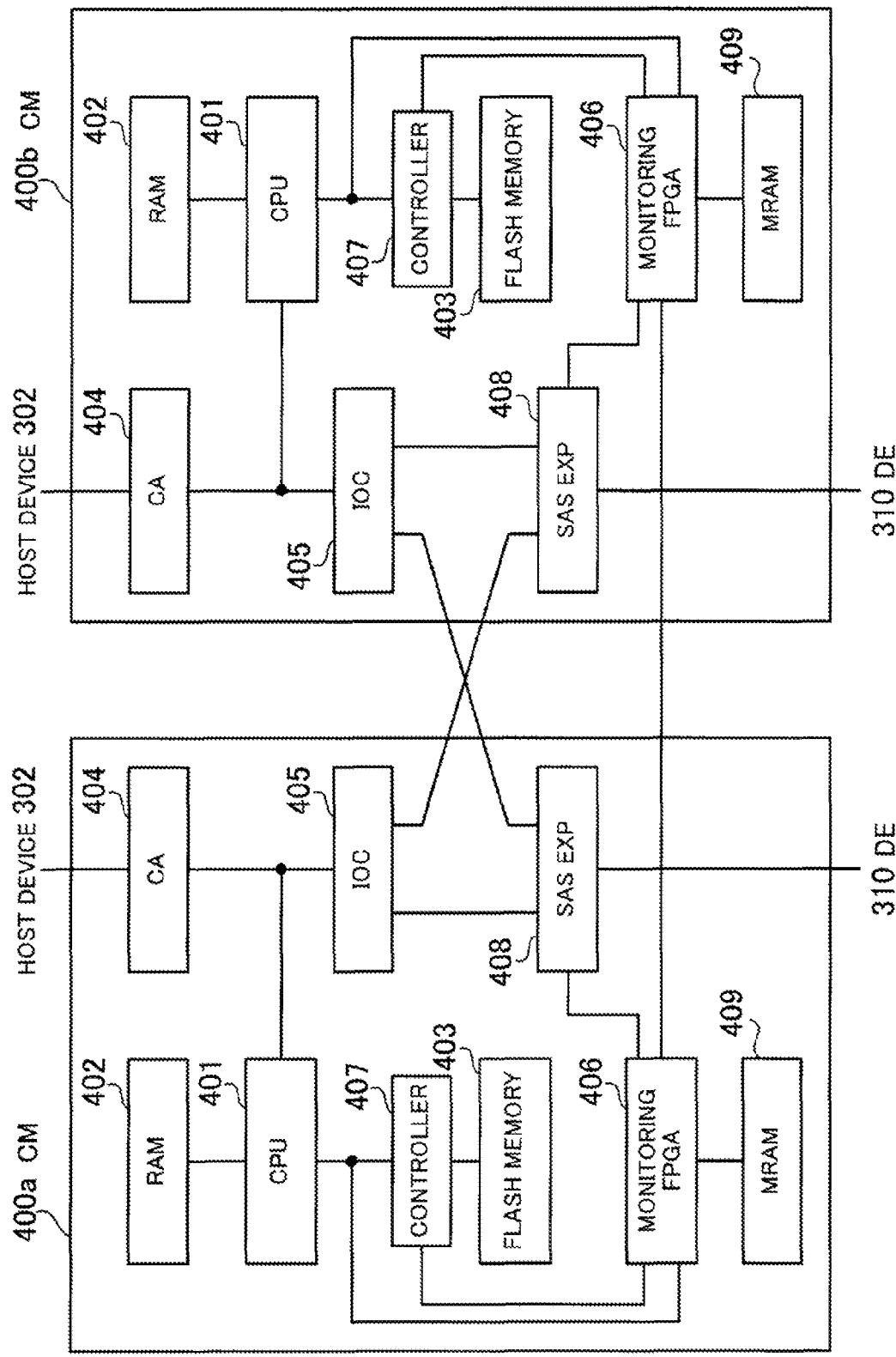
FIG. 22 illustrates example hardware configurations of two CMs.

FIG. 22 illustrates example hardware configurations of the CMs. Since the CMs 400a and 400b have similar hardware configurations, only the configuration of the CM 400a will be mainly described. In addition, the same reference numerals and symbols are used for components common to the CMs 400a and 400b.

The CM 400a is controlled by a CPU 401. A RAM 402 and a plurality of peripherals are connected to the CPU 401. The RAM 402 is used as a main storage of the CM 400a, and temporarily stores at least a part of programs executed by the CPU 401 and various data used for processing performed by the programs.

Peripherals such as a flash memory 403, a channel adapter (CA) 404, an input/output controller (IOC) 405, and a monitoring FPGA 406 are connected to the CPU 401. The flash memory 403 is connected to the CPU 401 via a controller 407, and the controller 407 and the monitoring FPGA 406 are connected to the CPU 401 via, for example, a platform controller hub (PCH; not illustrated). In addition, the CA 404 and the IOC 405 are connected to the CPU 401 via, for example, a peripheral component interconnect (PCI) switch (not illustrated).

The flash memory 403 is used as a secondary storage of the CM 400a, and stores programs executed by the CPU 401 and various data used to execute the programs. A nonvolatile storage of other types such as an HDD may be used as the secondary storage.

The controller 407 controls reading from and writing to the flash memory 403. The controller 407 also has a function of detecting bad blocks in storage areas of the flash memory 403 and a function of storing bad block information indicating the positions of the bad blocks in a magnetoresistive RAM (MRAM) 409 via the monitoring FPGA 406.

The CA 404 performs interface processing to transmit data between the host device 302 and the CM 400a.

The IOC 405 is a circuit that performs SAS interface processing. Herein, the term "SAS" refers to serial attached SCSI, and the term "SCSI" refers to small computer system interface. The IOC 405 of the CM 400a is connected to an SAS expander 408 included in the CM 400a and another SAS expander 408 included in the CM 400b. Both SAS expanders 408 of the CMs 400a and 400b are connected to the DE 310. The IOC 405 of the CM 400a may access to the DE 310 via the SAS expander 408 of the CM 400a, and may also access to the DE 310 via the other SAS expander 408 of the CM 400b. Since the transmission path connecting the CM 400a and the DE 310 is made redundant in this manner, reliability of accessing from the CM 400a to the storages of the DE 310 is improved.

Similarly, the IOC 405 of the CM 400b may access to the DE 310 via the SAS expander 408 of the CM 400b, and may also access to the DE 310 via the other SAS expander 408 of the CM 400a. Since the transmission path connecting the CM 400b and the DE 310 is made redundant in this manner, reliability of accessing from the CM 400b to the storages of the DE 310 is improved.

The monitoring FPGA 406 of the CM 400a has a function of monitoring the state of hardware in the CM 400a. When the monitoring FPGA 406 detects failure of the hardware in the CM 400a, for example, the monitoring FPGA 406 notifies the CPU 401 about failure detection information indicating the details of the detected failure. In addition, the monitoring FPGA 406 is connected to the MRAM 409, and stores, for example, state information indicating the state inside the CM 400a in the MRAM 409. The state information includes, for example, the state of power sources for each piece of hardware and log information relating to failure. In addition, in response to requests from the CPU 401 and the SAS expander 408, the monitoring FPGA 406 may read information including the state information stored in the MRAM 409 and transfer the information to the requesters.

In addition, the monitoring FPGA 406 has a function of transmitting data to and receiving data from the monitoring FPGA 406 of the other CM. For example, in response to requests from the CPU 401 or the SAS expander 408 of the CM 400a, the monitoring FPGA 406 of the CM 400a may transmit information to the CPU 401 or the SAS expander 408 of the other CM 400b, or may read information from the MRAM 409 of the other 400b. When these operations are carried out, the monitoring FPGA 406 of the CM 400a functions as a communication interface for communicating with the hardware in the other CM 400b.

The CPU 401 of the CM 400a transmits, for example, the failure detection information or the state information indicating the state of the CM 400a to the CPU 401 of the CM 400b via both the monitoring FPGA 406 of the CM 400a and the monitoring FPGA 406 of the CM 400b. The CPU 401 of the CM 400b recognizes the state of the CM 400a on the basis of the failure detection information and the state information from the CM 400a. In addition, the CPU 401 of the CM 400a also writes the failure detection information and the state information to the MRAM 409 of the other CM 400b via the monitoring FPGA 406 of the CM 400a and the monitoring FPGA 406 of the CM 400b.

Furthermore, supply voltages are supplied to the monitoring FPGAs 406 even when the power to the CMs is turned off. Therefore, if the power to the CM 400a is turned off due to some failure, for example, the other CM 400b acquires information (state information, failure detection information, bad block information, and the like) stored in the MRAM 409 of the CM 400a via the monitoring FPGA 406 of the CM 400a and the monitoring FPGA 406 of the CM 400b.

If the CM 400a aborts or the power to the CM 400a is turned off due to some failure, for example, the CPU 401 of the CM 400b executes processes appropriate for the failure. For example, the CPU 401 of the CM 400b may return the operation of the CM 400a on the basis of information that has been received from the CPU 401 of the CM 400a, the information stored in the MRAM 409 of the CM 400a, or the like.

As seen above, the information transferred via the monitoring FPGAs 406 is often important for the entire system since, for example, the information may be used when failure occurs. If bit errors occur during transmission of information via the monitoring FPGAs 406, for example, there is a possibility that a serious fault may occur in the entire storage device 301. Therefore, data transfer via the monitoring FPGAs 406 is demanded to be highly reliable. To this end, the monitoring FPGA 406s may be provided with the encoder 120 and the decoder 200 according to the first and second embodiments to transfer data via the encoder 120 and the decoder 200. This may lead to an improvement in reliability of data to be transferred.

Figure 23:
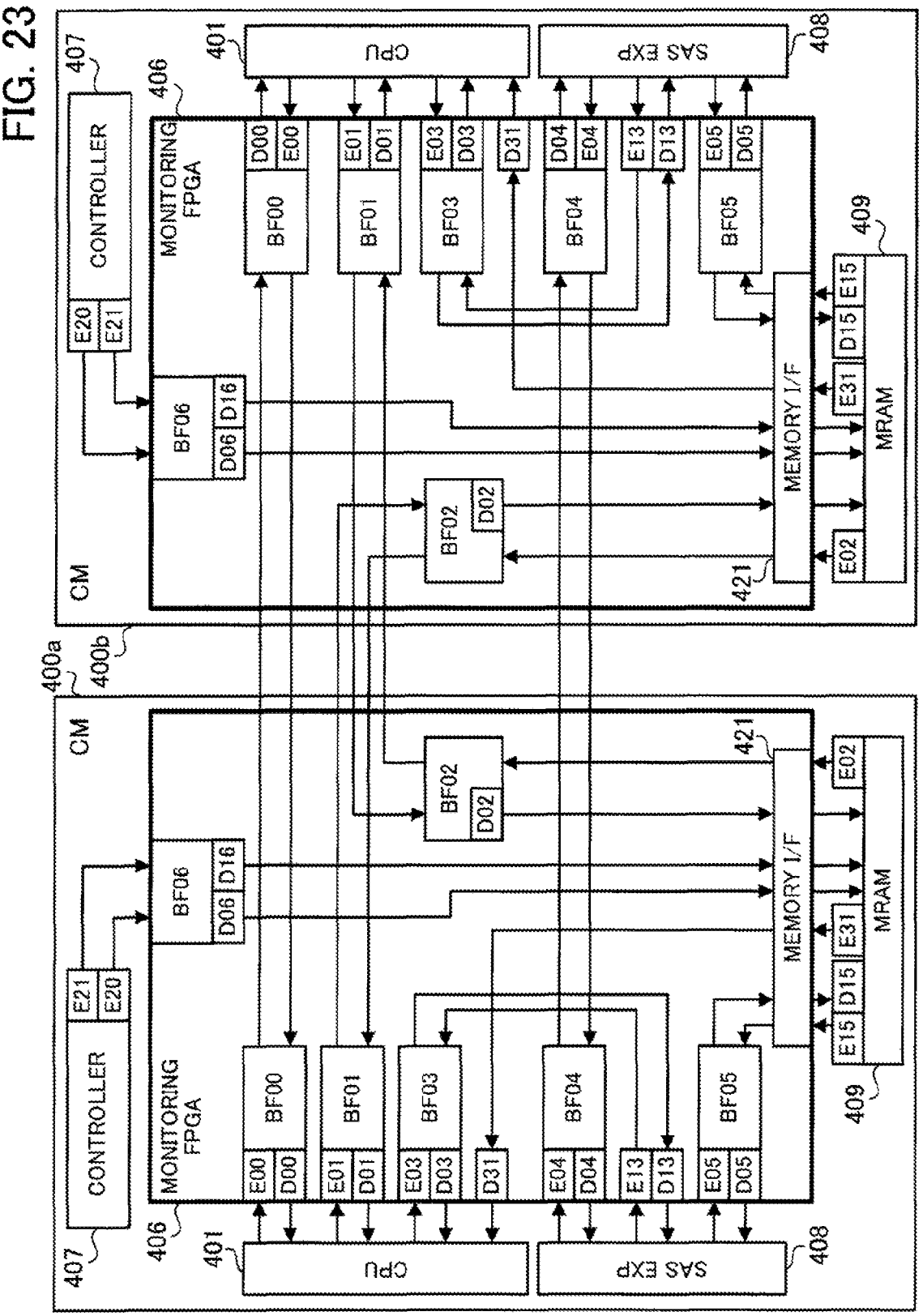
FIG. 23 illustrates an example configuration of data transfer paths in monitoring FPGAs.

FIG. 23 illustrates an example configuration of data transfer paths in the monitoring FPGAs. Since the monitoring FPGA 406 of the CM 400a and the monitoring FPGA 406 of the CM 400b have similar configurations, only the monitoring FPGA 406 of the CM 400a will be mainly described.

The monitoring FPGA 406 of the CM 400a includes a RAM (for example, SRAM). At least a part of areas of the RAM in the monitoring FPGA 406 is used as transmission and reception buffers when data is transferred via the monitoring FPGA 406. As illustrated in FIG. 23, the monitoring FPGA 406 of the CM 400a includes buffers BF00 to BF06 as the transmission and reception buffers. In addition, the monitoring FPGA 406 of the CM 400a includes a memory interface (I/F) 421 that controls reading from and writing to the MRAM 409 of the CM 400a.

Furthermore, the monitoring FPGA 406 of the CM 400a includes encoders E00, E01, E03 to E05, and E13 and decoders D00 to D06, D13, D16, and D31. The CM 400a includes encoders E02, E15, E20, E21, and E31 and a decoder D15 outside the monitoring FPGA 406. The encoders E00 to E05, E15, E20, E21, and E31 have configurations similar to that of the encoder 120, and the decoders D00 to D06, D13, D15, D16, and D31 have configurations similar to that of the decoder 200.

The buffer BF00 of the CM 400a is used as a transmission and reception buffer when data including state information and failure detection information is transmitted between the CPU 401 of the CM 400a and the CPU 401 of the CM 400b. The encoder E00 is disposed at an input stage of the buffer BF00 adjacent to the CPU 401, and the decoder D00 is disposed at an output stage of the buffer BF00 adjacent to the CPU 401.

Data to be transmitted from the CPU 401 of the CM 400a to the CPU 401 of the CM 400b is first converted into n-bit encoded data by the encoder E00 of the CM 400a, and stored in the buffer BF00 of the CM 400a. The encoded data is transferred from the buffer BF00 of the CM 400a to the buffer BF00 of the CM 400b without being changed. The encoded data stored in the buffer BF00 of the CM 400b is decoded by the decoder D00 when transferred to the CPU 401 of the CM 400b. The data is normally transferred to the CPU 401 of the CM 400b even if a single-bit error occurs in the encoded data while the encoded data is read from the buffer BF00 of the CM 400a, while the encoded data is read from the buffer BF00 of the CM 400b, or while the encoded data is transferred between the buffers. When a double-bit error occurs in the encoded data, the decoder D00 of the CM 400b detects the double-bit error, and, for example, notifies the CPU 401 of the CM 400a serving as the sender of the encoded data about an data transfer error.

When data is transmitted from the CPU 401 of the CM 400b to the CPU 401 of the CM 400a, single-bit error correction and double-bit error detection are similarly performed by the encoder E00 of the CM 400b and the decoder D00 of the CM 400a. This improves reliability of data transmission between the CPU 401 of the CM 400a and the CPU 401 of the CM 400b.

The buffers BF01 and BF02 are used as transmission and reception buffers when the CPU 401 of one of the CMs reads data from and writes data to the MRAM 409 of the other CM, the data including state information, failure detection information, and bad block information. The encoder E01 is disposed at an input stage of the buffer BF01 adjacent to the CPU 401, and the decoder D01 is disposed at an output stage of the buffer BF01 adjacent to the CPU 401. Furthermore, the decoder D02 is disposed at an output stage of the buffer BF02 adjacent to the MRAM 409.

Data to be written from the CPU 401 of the CM 400a to the MRAM 409 of the CM 400b is first converted into n-bit encoded data by the encoder E01 of the CM 400a, and stored in the buffer BF01 of the CM 400a. The encoded data is transferred from the buffer BF01 of the CM 400a to the buffer BF02 of the CM 400b without being changed. The encoded data stored in the buffer BF02 of the CM 400b is decoded by the decoder D02 of the CM 400b, and written to the MRAM 409 of the CM 400b via the memory interface 421 of the CM 400b. The data is normally written to the MRAM 409 of the CM 400b even if a single-bit error occurs in the encoded data while the encoded data is read from the buffer BF01 of the CM 400a, while the encoded data is read from the buffer BF02 of the CM 400b, or at a point while the encoded data is transferred from the buffer BF01 of the CM 400a to the buffer BF02 of the CM 400b. In addition, when a double-bit error occurs in the encoded data, the decoder D02 of the CM 400b detects the double-bit error, and, for example, notifies the CPU 401 of the CM 400a serving as the sender of the encoded data about a data write error.

In cases where the CPU 401 of the CM 400a reads data from the MRAM 409 of the CM 400b, the data to be read is stored in the buffer BF02 of the CM 400b after being encoded by the encoder E02 disposed at an output stage of the MRAM 409 of the CM 400b. The encoded data stored in the buffer BF02 of the CM 400b is stored in the buffer BF01 of the CM 400a, decoded by the decoder D01 of the CM 400a, and transferred to the CPU 401 of the CM 400a. The data is normally transferred to the CPU 401 of the CM 400a even if a single-bit error occurs in the encoded data while the encoded data is read from the buffer BF02 of the CM 400b, while the encoded data is read from the buffer BF01 of the CM 400a, at a point while the encoded data is transferred from the encoder E02 of the CM 400b to the buffer BF02 of the CM 400b, or at a point during transferring from the buffer BF02 of the CM 400b to the buffer BF01 of the CM 400a. In addition, when a double-bit error occurs in the encoded data, the decoder D01 of the CM 400a detects the double-bit error, and, for example, notifies the CPU 401 of the CM 400a serving as the requester asking for data reading about a data read error.

In this manner, the operations of the encoder E01 and the decoder D01 of the CM 400a and the encoder E02 and the decoder D02 of the CM 400b improve reliability of data transmission between the CPU 401 of the CM 400a and the MRAM 409 of the CM 400b.

The buffer BF03 of the CM 400a is used as a transmission and reception buffer when data including state information and failure detection information is transmitted between the CPU 401 of the CM 400a and the SAS expander 408 of the CM 400a. The encoder E03 is disposed at an input stage of the buffer BF03 adjacent to the CPU 401, and the decoder D13 is disposed at an output stage of the buffer BF03 adjacent to the SAS expander 408. In addition, the encoder E13 is disposed at an input stage of the buffer BF03 adjacent to the SAS expander 408, and the decoder D03 is disposed at an output stage of the buffer BF03 adjacent to the CPU 401. The operations of the encoders E03 and E13 and the decoders D03 and D13 improve reliability of data transmission between the CPU 401 and the SAS expander 408.

The buffer BF04 of the CM 400a is used as a transmission and reception buffer when data including state information and failure detection information is transmitted between the SAS expander 408 of the CM 400a and the SAS expander 408 of the CM 400b. The encoder E04 is disposed at an input stage of the buffer BF04 adjacent to the SAS expander 408, and the decoder D04 is disposed at an output stage of the buffer BF04 adjacent to the SAS expander 408. The operations of the encoder E04 and the decoder D04 of the CM 400a and the encoder E04 and the decoder D04 of the CM 400b improve reliability of data transmission between the SAS expander 408 of the CM 400a and the SAS expander 408 of the CM 400b.

The buffer BF05 of the CM 400a is used as a transmission and reception buffer when the SAS expander 408 of the CM 400a reads data from and writes data to the MRAM 409 of the CM 400a, the data including state information and failure detection information. The data written from the SAS expander 408 to the MRAM 409 is encoded by the encoder E05 disposed at an input stage of the buffer BF05, and stored in the buffer BF05. The encoded data stored in the buffer BF05 is input to the decoder D15 disposed at an input stage of the MRAM 409 via the memory interface 421, and written to the MRAM 409 after being decoded by the decoder D15.

Meanwhile, data to be read from the MRAM 409 to the SAS expander 408 is stored in the buffer BF05 via the memory interface 421 after being encoded by the encoder E15 disposed at an output stage of the MRAM 409. The encoded data stored in the buffer BF05 is decoded by the decoder D05 disposed at an output stage of the buffer BF05, and transferred to the SAS expander 408. The operations of the encoders E05 and E15 and the decoders D05 and D15 improve reliability of data transmission between the SAS expander 408 and the MRAM 409.

The buffer BF06 of the CM 400a is used as a buffer when the controller 407 of the CM 400a writes data including bad block information to the MRAM 409 of the CM 400a. The data output from the controller 407 is stored in the buffer BF06 after being encoded by the encoder E20 or the encoder E21. The data encoded by the encoder E20 and stored in the buffer BF06 is written to the MRAM 409 via the memory interface 421 after being decoded by the decoder D06 disposed at an output stage of the buffer BF06. Similarly, the data encoded by the encoder E21 and stored in the buffer BF06 is written to the MRAM 409 via the memory interface 421 after being decoded by the decoder D16 disposed at an output stage of the buffer BF06. The operations of the encoders E20 and E21 and the decoders D06 and D16 improve reliability of data transmission from the controller 407 to the MRAM 409.

The monitoring FPGA 406 of the CM 400a also includes the decoder D31 that operates when the CPU 401 of the CM 400a reads data from the MRAM 409 of the CM 400a. The data to be read from the MRAM 409 is encoded by the encoder E31 disposed at an output stage of the MRAM 409, and the encoded data is input to the decoder D31. The decoder D31 decodes the encoded data, and outputs the decoded data to the CPU 401. The operations of the encoder E31 and the decoder D31 improve reliability of data transmission from the MRAM 409 to the CPU 401.

Recently, the storage capacity of RAMs inside FPGAs has been increasing. Meanwhile, the amount of data transferred by the monitoring FPGAs 406 is significantly small compared with, for example, data in the logical volumes transmitted between the host device 302 and the CM 400a, between the host device 302 and the CM 400b, between the DE 310 and the CM 400a, and between the DE 310 and the CM 400b. Therefore, it may be said that the capacity of the RAMs inside the monitoring FPGAs 406 is sufficiently large in cases where the RAMs are used as buffers for data transmission. Since the capacity of the RAMs is sufficiently large as described above, the buffers BF00 to BF06 illustrated in FIG. 23 are well capable of storing encoded data although the amount of data is four times or more that of the original data.

The encoders E00, E01, E03 to E05, and E13 included in the monitoring FPGA 406 have configurations similar to that of the encoder 120, and the decoders D00 to D06, D13, D15, D16, and D31 have configurations similar to that of the decoder 200. As described above, the processing procedures performed by the encoder 120 and the decoder 200 are simple compared with, for example, those performed by encoders and decoders performing error detection and correction using ECC, and this may lead to a reduction in the scale of the circuits. Therefore, even with a large number of encoders and decoders as illustrated in FIG. 23, the encoders and the decoders may satisfactorily implement processes using the limited processing capacity of the monitoring FPGA 406.

That is, the encoder 120 and the decoder 200 are highly suitable for the monitoring FPGAs 406 having RAMs with sufficient capacity and having somewhat limited processing capacity since the processing procedures performed by the encoder 120 and the decoder 200 are simple although the amount of data is increased. Accordingly, a large number of encoders 120 and decoders 200 included in the monitoring FPGAs 406 as illustrated in FIG. 23 may improve reliability of data transferred via the monitoring FPGAs 406 without increasing the scale of the circuits and production costs.

Next, among the processes using the data transfer paths illustrated in FIG. 23, data transfer between the CPUs 401 of the two CMs will be described.

Figure 24:
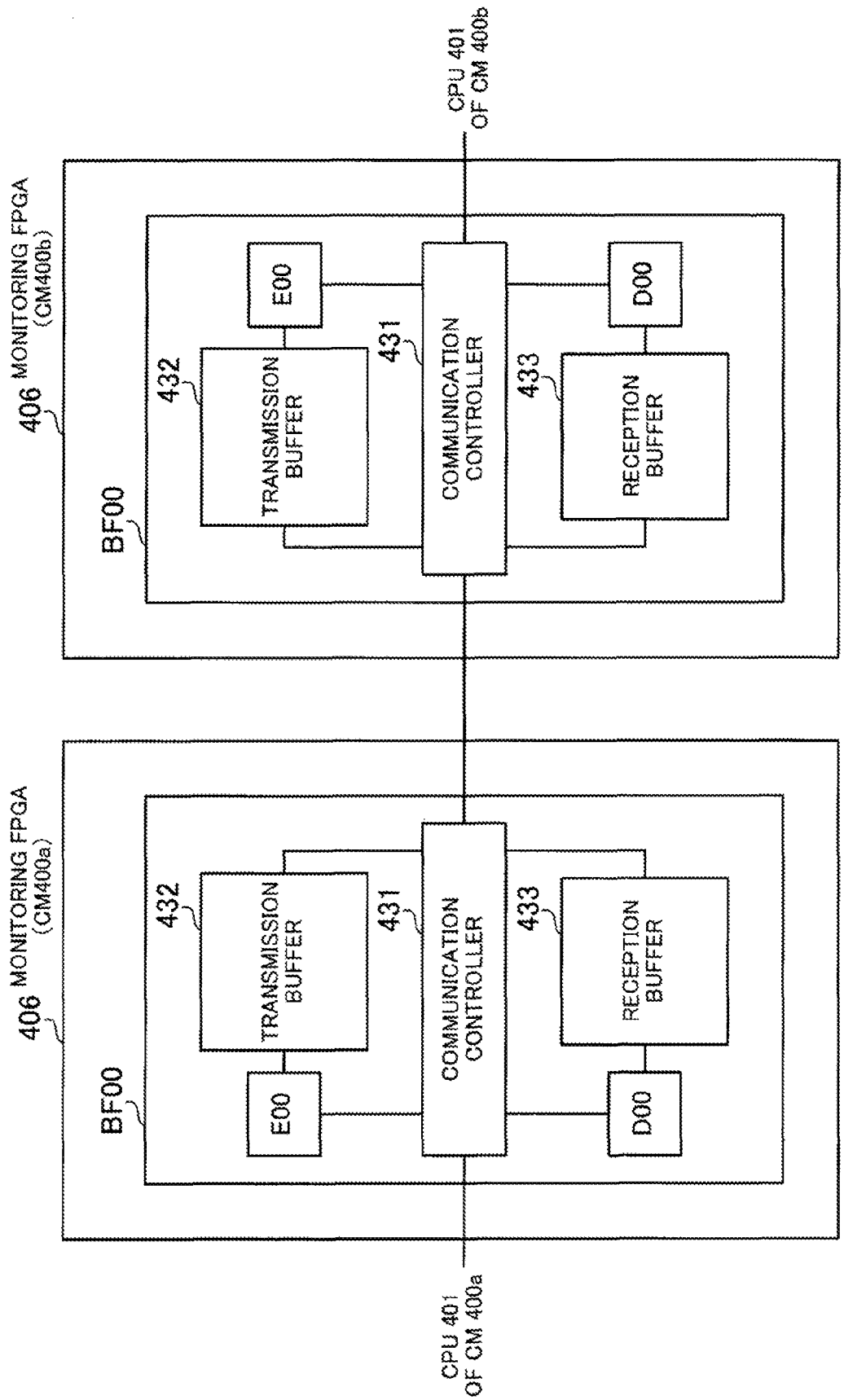
FIG. 24 is a block diagram illustrating example internal configurations of buffers that transfer data between the CPUs of the two CMs.

FIG. 24 is a block diagram illustrating example internal configurations of buffers that transfer data between the CPUs of the two CMs.

In the CM 400a, the buffer BF00 in the monitoring FPGA 406 includes a communication controller 431, a transmission buffer 432, and a reception buffer 433 in addition to the encoder E00 and the decoder D00. The buffer BF00 of the CM 400b also has a configuration similar to that of the buffer BF00 of the CM 400a.

The communication controller 431 in the BF00 of the CM 400a transmits packets to the communication controller 431 in the BF00 of the CM 400b in response to requests from the CPU 401 of the CM 400a. The packets include control packets that request processing and data packets that transfer data. When the communication controller 431 of the CM 400a receives data to be transmitted from the CPU 401 of the CM 400a, the communication controller 431 causes the encoder E00 to convert the data into encoded data, and stores the data in the transmission buffer 432. The communication controller 431 of the CM 400a reads the encoded data from the transmission buffer 432 to embed the data in data packets, and transmits the data packets to the communication controller 431 in the BF00 of the CM 400b. The communication controller 431 of the CM 400a transmits control packets after transmitting the data to be transmitted using the data packets.

When the communication controller 431 of the CM 400a receives data packets from the communication controller 431 of the CM 400b, the communication controller 431 extracts encoded data from the data packets, and stores the data in the reception buffer 433. Subsequently, when the communication controller 431 of the CM 400a receives control packets from the communication controller 431 of the CM 400b, the communication controller 431 of the CM 400a reads the encoded data from the reception buffer 433, supplies the encoded data to the decoder D00 to decode the data, and transmits the decoded data to the CPU 401 of the CM 400a.

FIG. 25 is a sequence diagram illustrating an example process sequence when data is normally transferred between the CPUs of the two CMs.

The CPU 401 of the CM 400a stores transmission data to be transmitted to the CPU 401 of the CM 400b in the buffer BF00 in the monitoring FPGA 406 of the CM 400a (Step S11). The communication controller 431 in the buffer BF00 of the CM 400a (hereinafter simply referred to as "communication controller 431 of the CM 400a") supplies the transmission data received from the CPU 401 of the CM 400a to the encoder E00 in the same buffer BF00. The encoder E00 converts the transmission data into encoded data, and stores the encoded data in the transmission buffer 432 in the same buffer BF00.

The CPU 401 of the CM 400a transmits a transmission instruction to the communication controller 431 of the CM 400a after completion of transmission of the transmission data (Step S12). Upon receiving the transmission instruction, the communication controller 431 of the CM 400a reads the encoded data stored in the transmission buffer 432 in Step S11 (Step S13), and stores the encoded data in the order of data packets. Subsequently, the communication controller 431 transmits the data packets to the buffer BF00 in the monitoring FPGA 406 of the CM 400b (Step S14). When the communication controller 431 in the buffer BF00 of the CM 400b (hereinafter simply referred to as "communication controller 431 of the CM 400b") receives the data packets from the communication controller 431 of the CM 400a, the communication controller 431 of the CM 400b extracts the encoded data from the data packets, and stores the encoded data in the reception buffer 433 in the same BF00.

The communication controller 431 of the CM 400a transmits control packets that request data transmission to the CPU 401 of the CM 400b to the communication controller 431 of the CM 400b after completion of transmission of the data packets (Step S15). The communication controller 431 of the CM 400b issues an interrupt to the CPU 401 of the CM 400b upon receiving the control packets (Step S16). When the CPU 401 of the CM 400b receives the interrupt, the CPU 401 checks the communication controller 431 of the CM 400b for a main cause of the interrupt (Step S17). For example, the communication controller 431 of the CM 400b stores status information indicating "receiving data" in the register thereof when issuing the interrupt in Step S16. The CPU 401 of the CM 400b having received the interrupt recognizes that there is data received from the CPU 401 of the CM 400a by reading the status information from the register of the communication controller 431 of the CM 400b in Step S17. At this moment, the CPU 401 of the CM 400b issues a data read instruction to the communication controller 431 of the CM 400b (Step S18).

Upon receiving the data read instruction, the communication controller 431 of the CM 400b reads the encoded data stored in the reception buffer 433 in Step S14 via the decoder D00 (Step S19), and transmits the data to the CPU 401 of the CM 400b. In Step S19, the encoded data read from the reception buffer 433 is decoded by the decoder D00, and the resultant output data Dout is supplied to the communication controller 431 of the CM 400b. At this moment, the communication controller 431 of the CM 400b receives error notification signals ERR and UE together with the output data Dout from the decoder D00.

In the example illustrated in FIG. 25, the error notification signal ERR is "0" (that is, no error bit), or the error notification signals ERR and UE are "1" and "0", respectively (that is, a single-bit error occurring), while the encoded data is being read from the reception buffer 433. In this case, the communication controller 431 of the CM 400b determines that the value of the output data Dout output from the decoder D00 is correct, and continues the data transmission to the CPU 401 of the CM 400b (Step S20).

After completion of the data transfer to the CPU 401 of the CM 400b, the CPU 401 of the CM 400b outputs a notification of completion to the communication controller 431 of the CM 400b (Step S21). The communication controller 431 of the CM 400b having received the notification of completion transmits control packets that notify about completion of data transmission to the communication controller 431 of the CM 400a (Step S22). The communication controller 431 of the CM 400a having received the control packets issues an interrupt to the CPU 401 of the CM 400a (Step S23). When the CPU 401 of the CM 400a receives the interrupt, the CPU 401 checks the communication controller 431 of the CM 400a for a main cause of the interrupt (Step S24). For example, the communication controller 431 of the CM 400a stores status information indicating "data transmission completed" in the register thereof when issuing the interrupt in Step S23. The CPU 401 of the CM 400a having received the interrupt recognizes that the data transmission to the CPU 401 of the CM 400b is completed by reading the status information from the register of the communication controller 431 of the CM 400a in Step S24.

FIG. 26 is a sequence diagram illustrating an example process sequence when data is not normally transferred between the CPUs of the two CMs. In FIG. 26, the same step numbers are used for processes similar to those illustrated in FIG. 25.

The processes in Steps S11 to S19 illustrated in FIG. 26 are similar to those illustrated in FIG. 25. Herein, it is assumed that, while the communication controller 431 of the CM 400b transmits the data read from the reception buffer 433 via the decoder D00 to the CPU 401 of the CM 400b in Step S19, the error notification signals ERR and UE from the decoder D00 become "1" and "1", respectively, that is, a double-bit error occurs (Step S31). When the communication controller 431 of the CM 400b detects that the error notification signals ERR and UE are "1" and "1", respectively, the communication controller 431 stops the data transmission to the CPU 401 of the CM 400b, and notifies the CPU 401 about the error. At the same time, the communication controller 431 of the CM 400b transmits control packets that notify about the error to the communication controller 431 of the CM 400a (Step S32).

The communication controller 431 of the CM 400a having received the control packets issues an interrupt to the CPU 401 of the CM 400a (Step S33). At this moment, for example, the communication controller 431 of the CM 400a stores status information indicating the occurrence of the transmission error in the register thereof. When the CPU 401 of the CM 400a receives the interrupt, the CPU 401 checks the communication controller 431 of the CM 400a for a main cause of the interrupt (Step S34). The CPU 401 of the CM 400a recognizes that an error occurred in the data transmission to the CPU 401 of the CM 400b by reading the status information from the register of the communication controller 431 of the CM 400a.

The CPU 401 of the CM 400a serving as the sender of the data may recognize whether or not the data is correctly transmitted to the CPU 401 of the CM 400b via the monitoring FPGA 406 of the CM 400a and the monitoring FPGA 406 of the CM 400b though the processing procedures illustrated in FIGS. 25 and 26. This improves reliability of data transmission from the CPU 401 of the CM 400a to the CPU 401 of the CM 400b.

The other buffers BF01 to BF06 in the monitoring FPGA 406 also include communication controllers substantially similar to that of the buffer BF00. The communication controllers of the buffers may determine whether or not data read errors occur on the basis of the error notification signals ERR and UE from decoders when the communication controllers read data from reception buffers in the same buffers via the decoders. This improves reliability of data transfer via the buffers. Herein, the decoder D31 in the monitoring FPGA 406 outputs the error notification signals ERR and UE to the CPU 401 in the same CM in addition to the output data Dout. This allows the CPU 401 having received data transmitted from the decoder D31 to determine whether or not the received data is correct.

In addition to the storage device 301, the encoder 120 and the decoder 200 may be provided for various information processing apparatuses. Furthermore, in addition to FPGAs, the encoder 120 and the decoder 200 may be formed in various semiconductor devices.

The semiconductor devices, the information processing apparatuses, and methods of detecting errors may improve reliability of data transmission using small-scale circuits.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A semiconductor device comprising:
    a decoding circuit including
        (n−1) 2-bit checking units, where n is an integer larger than or equal to 4, each receiving n-bit redundant encoded data generated from 1-bit input data and outputting (n−1) sets of 2-bit check data based on results of comparisons between bits of the encoded data, combinations of the bits differing in each comparison,
        an all-bit checking unit that outputs all-bit check data based on exclusive ORs of all bits of the encoded data, and
        an error detecting unit that detects errors in the encoded data on the basis of the (n−1) sets of the 2-bit check data and the all-bit check data and that outputs the input data on the basis of a result of error detection.

2. The semiconductor device according to claim 1, wherein the error detecting unit including
    a first determining unit that determines the existence of error bits of the encoded data on the basis of the (n−1) sets of the 2-bit check data and the all-bit check data, and
    a second determining unit that determines whether or not the number of the detected error bits is one on the basis of the all-bit check data in cases where the first determining unit determines that error bits exist.

3. The semiconductor device according to claim 1, wherein the error detecting unit further includes a data output unit that selects a bit from the encoded data, the bit not being an error bit, on the basis of the (n−1) sets of the 2-bit check data and the all-bit check data and that outputs the value of the selected bit as the input data.

4. The semiconductor device according to claim 1, wherein the error detecting unit further includes a data output unit that selects a bit from the encoded data, the bit not being an error bit, on the basis of any set of the 2-bit check data and that outputs the value of the selected bit as the input data.

5. The semiconductor device according to claim 1, wherein the encoded data stores the same value as the input data in some of the bits thereof, and stores an inverted value of the input data in the remaining bits.

6. The semiconductor device according to claim 1, further comprising:
a memory circuit that stores the encoded data, wherein
the decoding circuit reads the encoded data from the memory circuit.

7. The semiconductor device according to claim 6, further comprising:
an encoding circuit that converts the input data into the encoded data and that writes the encoded data to the memory circuit.

8. An information processing apparatus comprising:
a decoding circuit including
(n−1) 2-bit checking units, where n is an integer larger than or equal to 4, each receiving n-bit redundant encoded data generated from 1-bit input data and outputting (n−1) sets of 2-bit check data based on results of comparisons between bits of the encoded data, combinations of the bits differing in each comparison,
an all-bit checking unit that outputs all-bit check data based on exclusive ORs of all bits of the encoded data, and
an error detecting unit that detects errors in the encoded data on the basis of the (n−1) sets of the 2-bit check data and the all-bit check data and that outputs the input data on the basis of a result of error detection.

9. The information processing apparatus according to claim 8, wherein
the error detecting unit including
a first determining unit that determines the existence of error bits of the encoded data on the basis of the (n−1) sets of the 2-bit check data and the all-bit check data, and
a second determining unit that determines whether or not the number of the detected error bits is one on the basis of the all-bit check data in cases where the first determining unit determines that error bits exist.

10. The information processing apparatus according to claim 8, wherein the error detecting unit further includes a data output unit that selects a bit from the encoded data, the bit not being an error bit, on the basis of the (n−1) sets of the 2-bit check data and the all-bit check data and that outputs the value of the selected bit as the input data.

11. The information processing apparatus according to claim 8, wherein the error detecting unit further includes a data output unit that selects a bit from the encoded data, the bit not being an error bit, on the basis of any set of the 2-bit check data and that outputs the value of the selected bit as the input data.

12. The information processing apparatus according to claim 8, wherein the encoded data stores the same value as the input data in some of the bits thereof, and stores an inverted value of the input data in the remaining bits.

13. The information processing apparatus according to claim 8, further comprising:
a memory circuit that stores the encoded data, wherein
the decoding circuit reads the encoded data from the memory circuit.

14. The information processing apparatus according to claim 13, further comprising:
an encoding circuit that converts the input data into the encoded data and that writes the encoded data to the memory circuit.

15. A method of detecting errors using an information processing apparatus, the method comprising:
receiving n-bit redundant encoded data, where n is an integer larger than or equal to 4, generated from 1-bit input data;
outputting (n−1) sets of 2-bit check data based on results of comparisons between bits of the encoded data, combinations of the bits differing in each comparison, while outputting all-bit check data based on exclusive ORs of all bits of the encoded data; and
detecting errors in the encoded data on the basis of the (n−1) sets of the 2-bit check data and the all-bit check data and outputting the input data on the basis of a result of error detection.

16. The method according to claim 15, wherein the detecting errors in the encoded data determines the existence of error bits of the encoded data on the basis of the (n−1) sets of the 2-bit check data and the all-bit check data, and determines whether or not the number of the detected error bits is one on the basis of the all-bit check data in cases where it is determined that error bits exist.

17. The method according to claim 15, wherein the detecting errors in the encoded data selects a bit from the encoded data, the bit not being an error bit, on the basis of the (n−1) sets of the 2-bit check data and the all-bit check data, and outputs the value of the selected bit as the input data.

18. The method according to claim 15, wherein the detecting errors in the encoded data selects a bit from the encoded data, the bit not being an error bit, on the basis of any set of the 2-bit check data, and outputs the value of the selected bit as the input data.

19. The method according to claim 15, wherein the encoded data stores the same value as the input data in some of the bits thereof, and stores an inverted value of the input data in the remaining bits.

* * * * *